(12) United States Patent
Farris

(10) Patent No.: US 10,959,564 B1
(45) Date of Patent: *Mar. 30, 2021

(54) BEVERAGE DISPENSING VALVE

(71) Applicant: Red River Tea Company, Dallas, TX (US)

(72) Inventor: Jeff Farris, Argyle, TX (US)

(73) Assignee: Red River Tea Company, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,820

(22) Filed: Jul. 16, 2019

Related U.S. Application Data

(63) Continuation of application No. 15/339,538, filed on Oct. 31, 2016, now Pat. No. 10,405,692, which is a continuation of application No. 14/332,051, filed on Jul. 15, 2014, now Pat. No. 9,591,945, which is a continuation of application No. 13/421,359, filed on Mar. 15, 2012, now abandoned.

(60) Provisional application No. 61/528,846, filed on Aug. 30, 2011, provisional application No. 61/452,813, filed on Mar. 15, 2011.

(51) Int. Cl.
| | |
|---|---|
| *F16K 7/04* | (2006.01) |
| *A47J 31/46* | (2006.01) |
| *F16K 7/06* | (2006.01) |
| *A47J 31/41* | (2006.01) |
| *F16K 31/60* | (2006.01) |
| *B67D 3/04* | (2006.01) |

(52) U.S. Cl.
CPC .............. *A47J 31/46* (2013.01); *A47J 31/41* (2013.01); *F16K 7/063* (2013.01); *F16K 31/602* (2013.01); *B67D 3/041* (2013.01)

(58) Field of Classification Search
CPC ......... A47J 31/46; A47J 31/41; F16K 31/602; F16K 7/063; B67D 3/041
See application file for complete search history.

(56) References Cited

U.S. PATENT DOCUMENTS

| | | | |
|---|---|---|---|
| 2,471,623 A | 5/1949 | Hubbell | |
| 2,549,207 A | 4/1951 | Kestenbaum | |
| 2,660,395 A * | 11/1953 | Mair | F16K 7/065 251/6 |

(Continued)

OTHER PUBLICATIONS

KanPak CDG 211H Series Liquid Dispenser product specifications.

*Primary Examiner* — Vishal Pancholi
*Assistant Examiner* — Bob Zadeh
(74) *Attorney, Agent, or Firm* — Kirby Drake

(57) ABSTRACT

A beverage dispensing valve may include a downspout assembly having a body having walls with a slot therein, a channel, an upper and a lower opening, with the slot in the channel between the upper and lower openings. The downspout assembly may include a lateral member extending laterally from the downspout assembly and engaging the wall adjacent the slot. A pinch member may be partly enclosed within the lateral member and dimensioned to move partially through the slot. A handle and the pinch member may move the pinch member in and out of the slot. A coil spring may engage the lateral member and the pinch arm urging the pinch arm at least partially through the slot of the body. A flexible insert may be dimensioned to tightly fit against the walls of the channel of the body, the insert having an open top and an open bottom.

20 Claims, 19 Drawing Sheets

(56) References Cited

U.S. PATENT DOCUMENTS

| | | | |
|---|---|---|---|
| 3,350,053 A | | 10/1967 | Schmitz |
| 3,539,081 A | * | 11/1970 | Norton .................... B67D 3/041 |
| | | | 222/185.1 |
| 3,976,277 A | * | 8/1976 | Basel ....................... F16K 7/06 |
| | | | 251/7 |
| 3,982,724 A | | 9/1976 | Citrin |
| 4,037,817 A | * | 7/1977 | Chernak .................. F16K 7/06 |
| | | | 251/7 |
| 4,044,989 A | * | 8/1977 | Basel ....................... F16K 7/06 |
| | | | 251/7 |
| 4,286,755 A | | 9/1981 | Shipman |
| 4,303,222 A | | 12/1981 | Campbell |
| 4,392,488 A | | 7/1983 | Will |
| 4,877,053 A | | 10/1989 | Yusko, Jr. et al. |
| 4,961,508 A | | 10/1990 | Weimer et al. |
| 6,116,467 A | | 9/2000 | Petriekis et al. |
| 6,361,016 B1 | | 3/2002 | Schulz |
| 7,641,170 B2 | | 1/2010 | Spray et al. |
| 8,678,247 B2 | * | 3/2014 | Haskayne ............. B67D 1/1411 |
| | | | 222/400.7 |
| 9,591,945 B2 | * | 3/2017 | Farris .................... F16K 31/602 |
| 10,405,692 B1 | * | 9/2019 | Farris .................... F16K 31/602 |
| 2003/0010946 A1 | | 1/2003 | Furukawa et al. |
| 2006/0138369 A1 | | 6/2006 | Tomioka et al. |
| 2010/0107885 A1 | | 5/2010 | Kirschner et al. |
| 2011/0036873 A1 | | 2/2011 | Peckels |

* cited by examiner

Concentrate/Circuit Make Up Water

Fresh Brew Curcuit

Section A-A

Section B-B

BEVERAGE DISPENSING VALVE

CROSS REFERENCE TO RELATED APPLICATIONS

This application is a continuation and claims the benefit of U.S. patent application Ser. No. 15/339,538 filed on Oct. 31, 2016, which is a continuation and claims the benefit of U.S. patent application Ser. No. 14/332,051 filed on Jul. 15, 2014, which is a continuation of U.S. patent application Ser. No. 13/421,359 filed on Mar. 15, 2012, which claims the benefit under 35 U.S.C. § 119(e) to U.S. Provisional Patent Application No. 61/528,846 filed on Aug. 30, 2011 and U.S. Provisional Patent Application No. 61/452,813 filed on Mar. 15, 2011, all of which are incorporated by reference in their entirety.

FIELD OF THE DISCLOSURE

The present disclosure generally relates to a beverage dispensing valve, and more particularly to a beverage dispensing machine that is capable of dispensing fresh brewed and concentrate tea through flow control circuits.

BACKGROUND

Typically, tea dispensers provide for either dispensing of a tea made from a combination of a concentrate and diluent, such as water, or fresh brewed tea. Fluid flow circuits are typically provided with pumps for metering the flow of a concentrate and a diluent in a controlled ratio so the tea from the concentrate is not too strong and not too weak. Fresh brewed tea mix dispensers typically provide for a combination of hot water with either loose tea leaves or tea leaves in a bag, which tea leaves will steep in the water for a period of time, then deliver to the user.

SUMMARY

Embodiments of the present disclosure may provide a hot tea dispensing machine. The hot tea dispensing machine may have a tea brew basket with an urn situated below. A housing may be provided for supporting the urn and the brew basket above the urn. Flow control circuits may be provided that deposit hot water above the brew basket and makeup water and a concentrate directly into the urn. The makeup water and concentrate may be pressurized and the flow directed from nozzles may direct a stream of the concentrate and the makeup water so they intersect within the interior of the urn, typically above a fluid high level and below an upper rim of the urn.

Other embodiments of the present disclosure may provide a multi-station dispensing unit for dispensing fresh brewed tea or another drink. At least one station of the multi-station unit may have an urn adapted to receive fluids from a nozzle assembly located above the urn and also to receive strong, hot fresh brewed tea from a brew basket above the urn for providing the strong, hot fresh brewed tea to the urn. A nozzle assembly may be provided so as to provide both makeup water and a concentrate, the makeup water for diluting the strong, hot fresh brewed tea from the brew basket and the concentrate being one or more of a sweetener and/or a flavor.

Additional embodiments of the present disclosure may provide a tea dispensing machine for engaging at least one pressurized concentrate source and a pressurized water source. The tea dispensing machine may include at least one urn having side walls, an urn interior, a floor, and an upper rim, at least one of tea brew basket, a housing having a base and an upper section, the base configured to engage the urn, the upper section configured to engage the tea basket so that the tea basket is over an urn; a hot water fluid circuit comprising a hot water leg, including a flow control valve, with at least one removed end situated above a brew basket; a makeup water/concentrate fluid circuit comprising a makeup water leg, including a flow control valve, with a removed end, the removed end proximate the urn, and also at least one concentrate leg, including a flow control valve, with a removed end, the removed end proximate the urn; wherein the removed ends of the makeup water leg and the concentrate leg are directed such that a pressurized flow controlled fluid emitted from each simultaneously at least partly converges within the urn interior.

Further embodiments of the present disclosure may provide a beverage dispensing valve for dispensing a beverage from a container. The beverage dispensing valve may include a downspout assembly having a body having walls with a slot therein. The downspout assembly may include a channel, an upper opening and a lower opening, with the slot in the channel between the upper and lower openings. The downspout assembly may include a lateral member typically extending laterally from the downspout assembly and engaging the wall adjacent the slot. A pinch member may be at least partly enclosed within the lateral member and dimensioned to move partially through the slot. A handle may engage the removed end of the lateral member and the pinch member and may move the pinch member in and out of the slot. A coil spring may be provided for engaging the lateral member and the pinch arm urging the pinch arm at least partially through the slot of the body. A pliable, flexible silicon-based, elastomer sleeve or insert or other suitable member may be dimensioned to tightly fit against the walls of the channel of the body, the insert having an open top and an open bottom. The pinch member may be engaged to the wall of the slot, and when the pinch member moves through the slot into the interior of the channel of the body, the pinch member may shut off and closes any fluid flow therethrough. When the pinch member is moved via the handle so that it is at least partially out of the slot, fluid may be allowed to flow under the impetus of gravity between the upper opening of the insert and the lower opening of the insert.

Embodiments of the present disclosure may provide a beverage dispensing valve for engaging a beverage container. The valve may include a downspout assembly having a substantially vertical body and having walls defining a generally vertical channel therethrough and having a slot in the walls, the walls defining an upper opening and a lower opening; the body with a lateral member extending laterally from the slot. The valve may include a flexible, resilient sleeve-like insert having a channel with an upper and lower opening, the insert dimensioned to snuggly engage the walls of the channel, at least adjacent the slot.

The valve may include a pinch member dimensioned to move at least partly through the slot and, at least partly into the channel and against the insert and a handle, adapted to engage the pinch member to move the pinch member between a pinched position wherein the channel of the pinch member is substantially closed and an open position wherein the channel is at least partially open. The handle may include a generally vertical portion adapted to be grasped by the hand. The vertical portion may extend generally vertically upward. The valve may include a biasing member engaging the pinch member and the body to urge the pinch member to the closed portion. The valve may include including a pin for engaging the handle to the pinch member. The insert may at least partially extend between the ends of the channel of the body and the insert may be adapted to seal fluidly against the walls of the downspout assembly. The insert may have a handle extending at least partly upward from the walls defining the upper opening. The insert may be comprised of a silicon-based elastomer.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
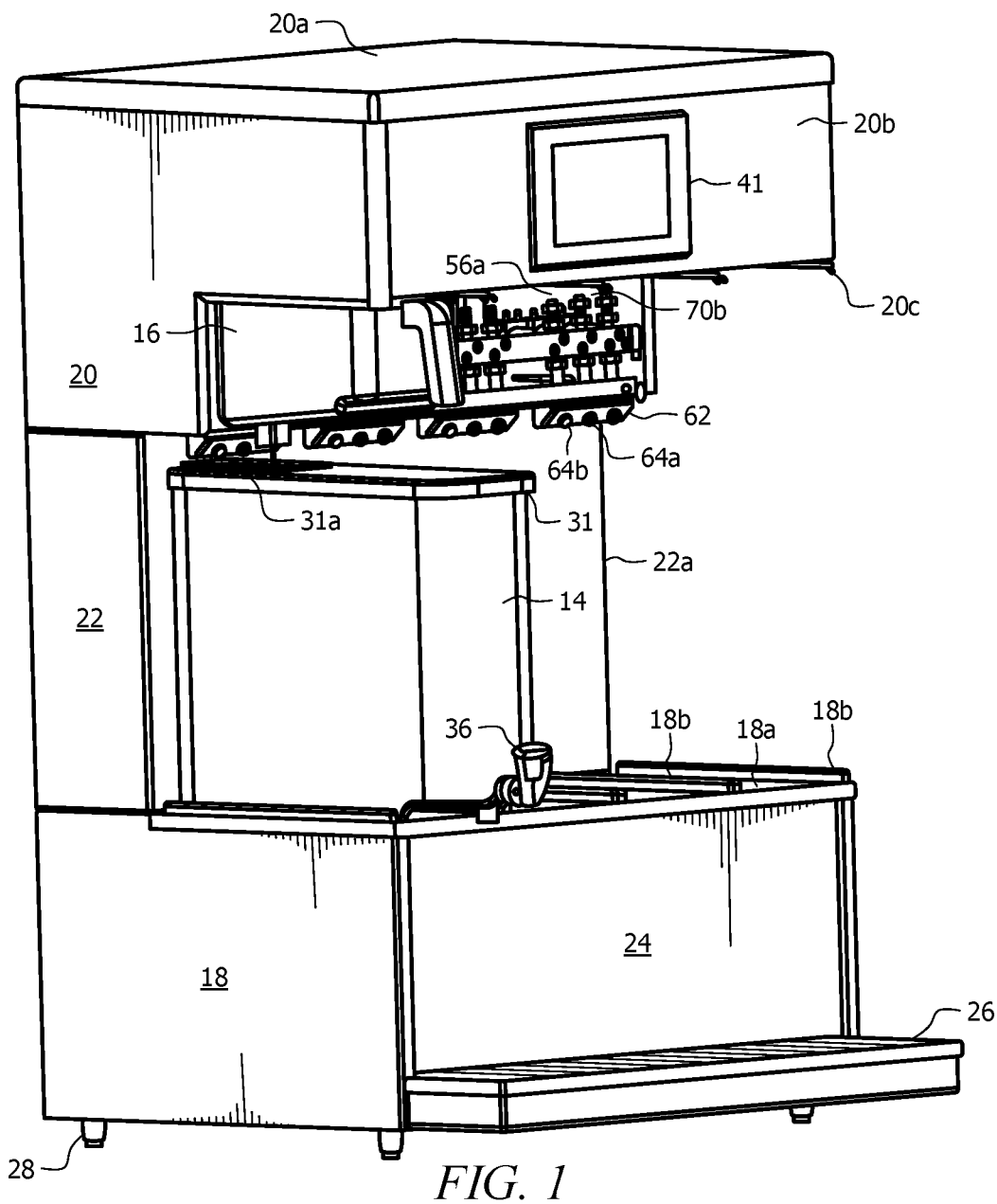
FIG. 1 depicts a right side perspective view of the exterior of a combination unit with a front panel removed, and a brew basket/urn set at a first of four stations according to an embodiment of the present disclosure.
Figure 2:
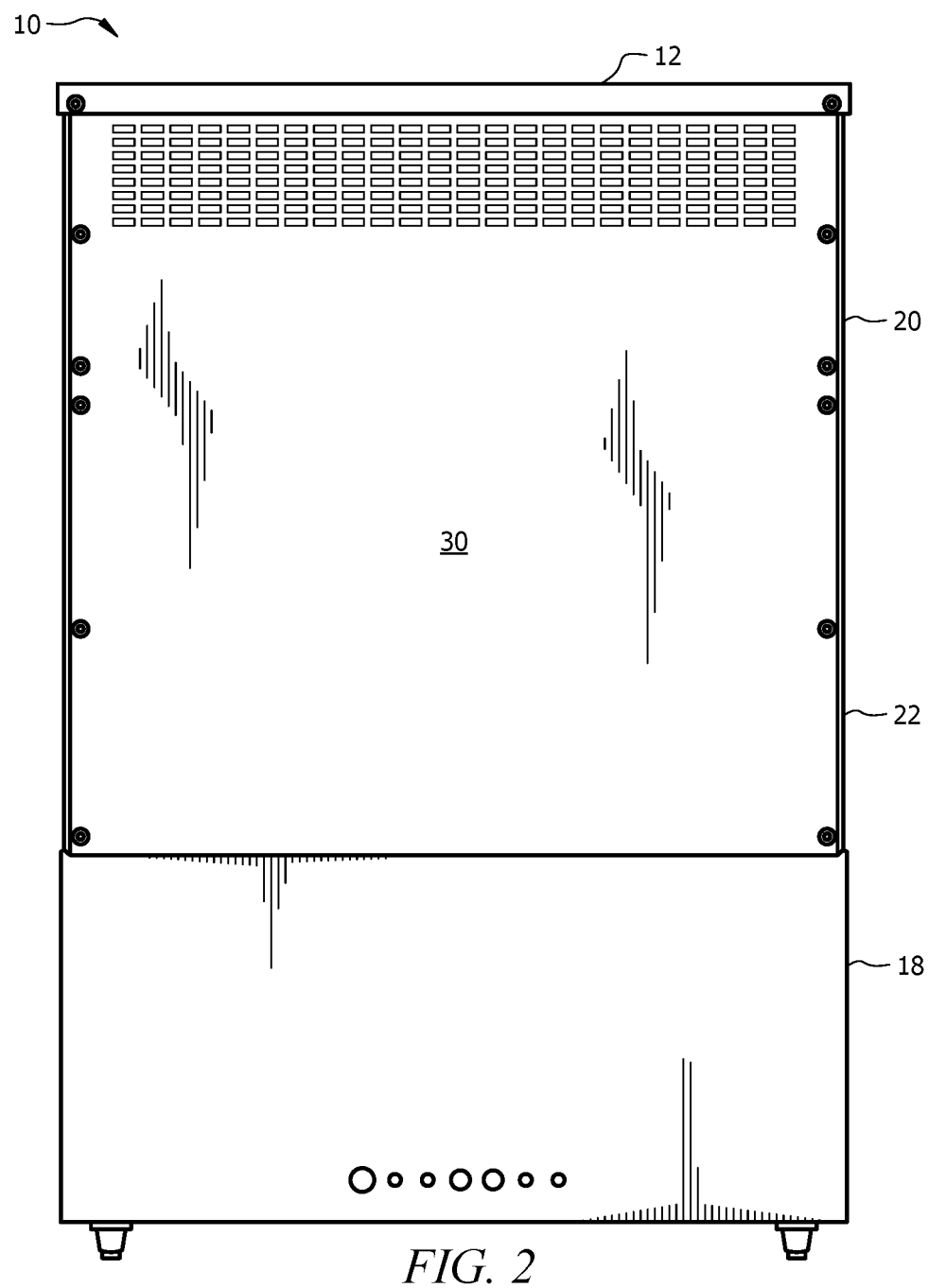
FIG. 2 depicts a rear elevational view of a combination unit according to an embodiment of the present disclosure.

Turning to FIGS. 1 and 2, embodiments of the present disclosure may provide combination unit 10 that may be at any one of a multiple of stations capable of dispensing at the user's choice, either a fresh brewed tea or a concentrate mix tea prepared from a bag in box (BIB) concentrate and a diluent, such as water. A device according to embodiments of the present disclosure may provide a combination unit in several senses of the term. In one instance, having multiple stations, one station may be programmed to provide an urn full of fresh brew tea and a second station, structurally substantially to the first, may be programmed to deliver an urn full of concentrate mix tea. Therefore, a unit according to embodiments of the present disclosure may combine in a single device the capability of providing either a concentrate mix beverage or a fresh brewed beverage. However, a device according to embodiments of the present disclosure may provide a combination unit in the sense that a single station out of the multiple stations may combine the ability to adapt and serve, at the user's control, either a fresh brew or a concentrate mixed beverage urn.

As set forth herein, there may be multiple stations in a dispensing unit. Each station may be plumbed for either or both of a fresh brewed circuit or a tea concentrate, a makeup water circuit (every station), and a concentrate circuit as set forth in more detail below. Moreover, the concentrate circuit may be one or more of a concentrate tea, a sweetener or a flavor for the tea.

Combination unit 10 may include various hardware components, fluid flow circuits, and electronic controls of the fluid flow circuits that may engage with the flow control of the fluid flow circuits to provide precise metered delivery of a diluent, a concentrate or a fresh brewed product to the consumer.

Figure 6:
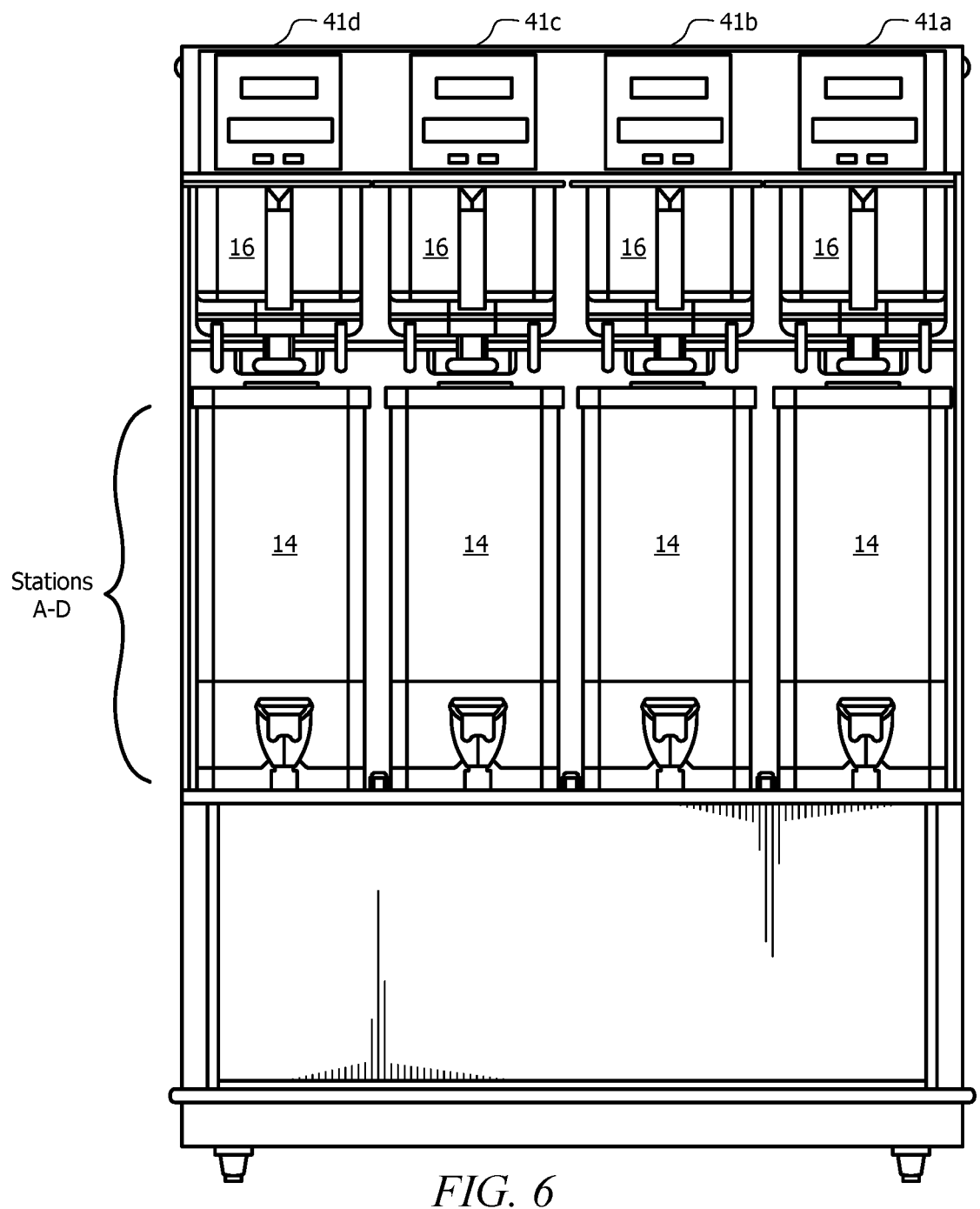
FIG. 6 illustrates a front elevational view of a combination unit according to an embodiment of the present disclosure.

FIGS. 1 and 2 illustrate housing 12, typically fabricated from sheet steel or other suitable material. Housing 12 may provide support for at least one tea urn 14 and at least one brew basket 16. Attention is called to the position and size of the urns 14 and brew baskets 16. Urn 14 may be disposed below tea basket 16 to create one dispensing station. Four dispensing stations are illustrated as A-D as seen in FIG. 6. Urn 14 may be significantly larger than the brew basket, typically about 3 gallons in capacity, and may include opening 31 in the top or lid 31 for receipt of a strong fresh brewed tea from smaller brew basket 16, which may be about 96 ounces in capacity and may be located above the urn. Moreover, there may be four sets of urns and tea baskets (that is to say, four dispensing stations), though only one is illustrated in FIG. 1. The urns may slide into housing 12 as illustrated in FIG. 1 and tea baskets 16 may slide into rails 20c as seen in FIG. 1. That is, one of the functions of housing 12 is to support both tea urn (from below) and a brew basket, so that the brew basket is above the urn.

Housing 12 may comprise base 18 and spaced apart upper housing 20 with upper housing support 22 between the base and the upper housing. Upper housing 20 may comprise top cover 20a and front face 20b. Upper housing support 22 may include front wall 22a. Housing 12 may also include splash plate 24 across the front of base 18, and splash plate 24 may be located below dispensing valve assembly 36 of urn 14. Base 18 may also be provided with drip tray 26 for spillover and draining. Legs 28, such as the four illustrated in FIGS. 1 and 2, may be provided on a bottom perimeter (see FIGS. 2A and 2B) for supporting the unit on a support surface.

Turning to FIGS. 3A, 3B, 9, and 10, views of tea urn 14 are illustrated. Tea urn 14 may comprise urn base 32 and urn body 34 having an upper perimeter or rim 14a. Urn base 32 may have lower perimeter lip 32a that may be a rubber or soft grommet or border or that is simply the lower perimeter of the side walls and is designed to engage rails 18b on top surface 18a of urn body 34 as seen in FIG. 1. This may provide lateral positioning of the urns as they lay adjacent aligned one with another as seen in FIG. 6. Urn body 34 may hold the mixed (ready to serve) beverage and valve assembly 36 may dispense, by gravity, the beverage contained in the body to a handheld drink container (not shown).

Figure 2A:
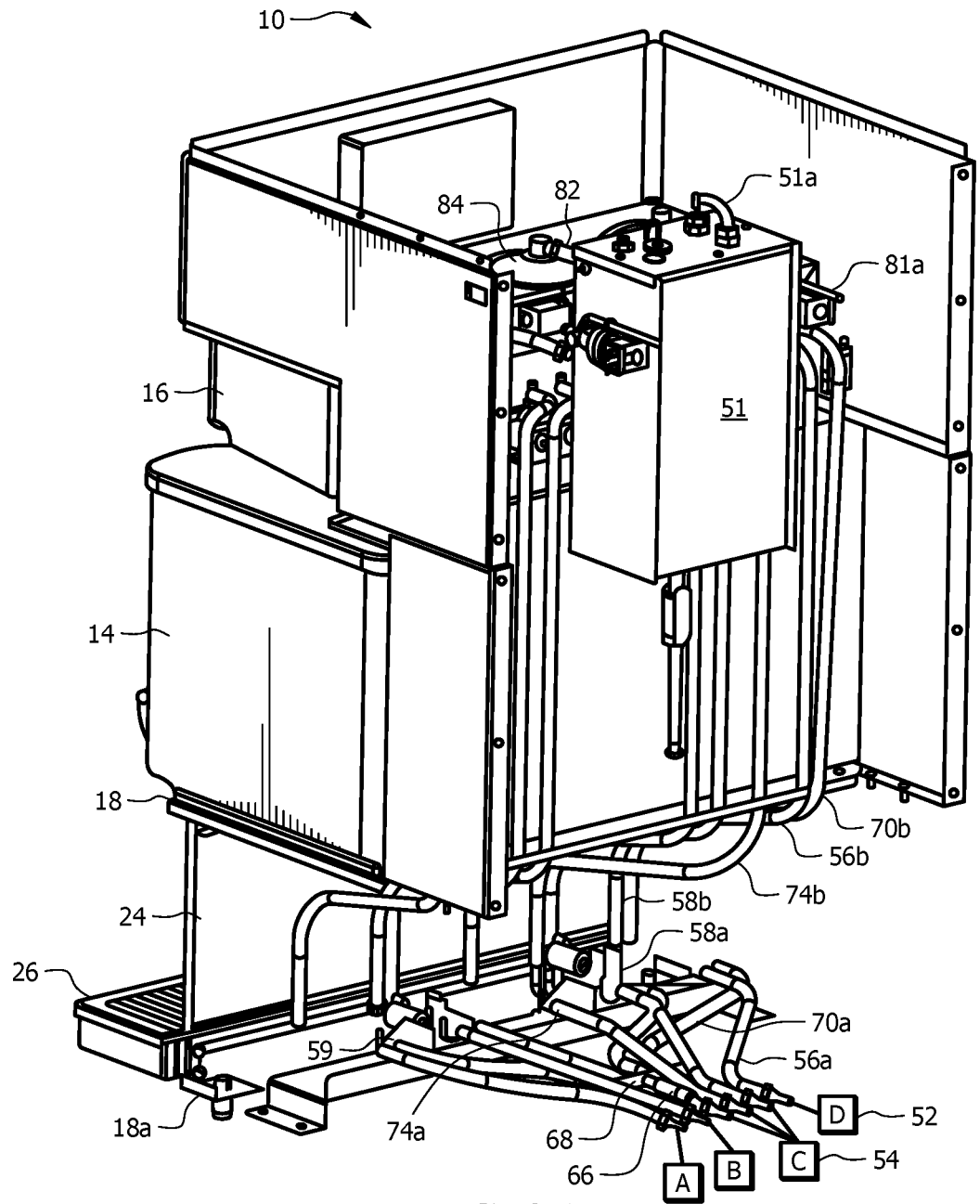
FIG. 2A depicts a rear left side perspective view of a unit with the rear and side housing panels removed according to an embodiment of the present disclosure.
Figure 2B:
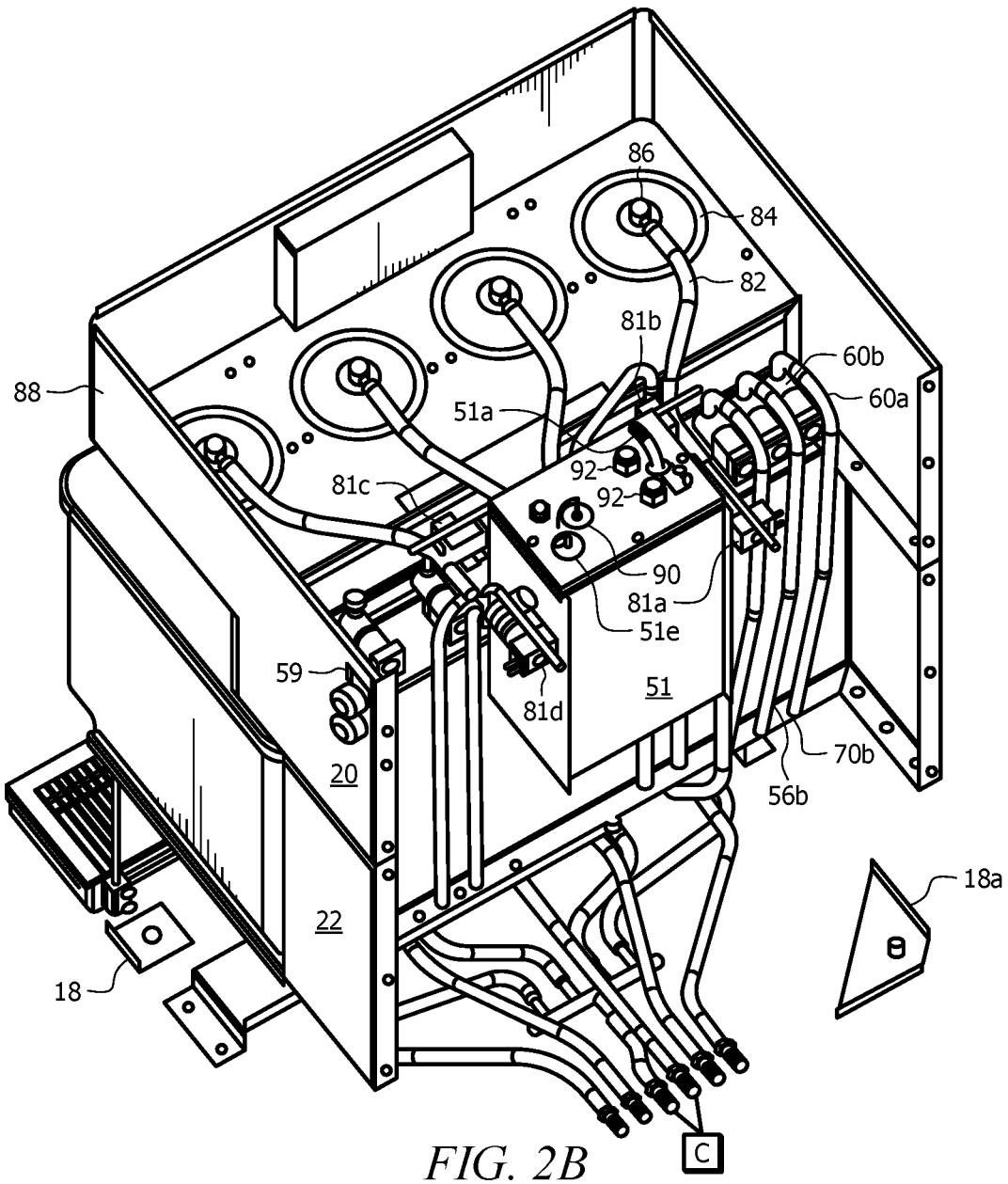
FIG. 2B depicts a rear top side perspective view of a unit with the rear and side housing panels removed according to an embodiment of the present disclosure.
Figure 2C:
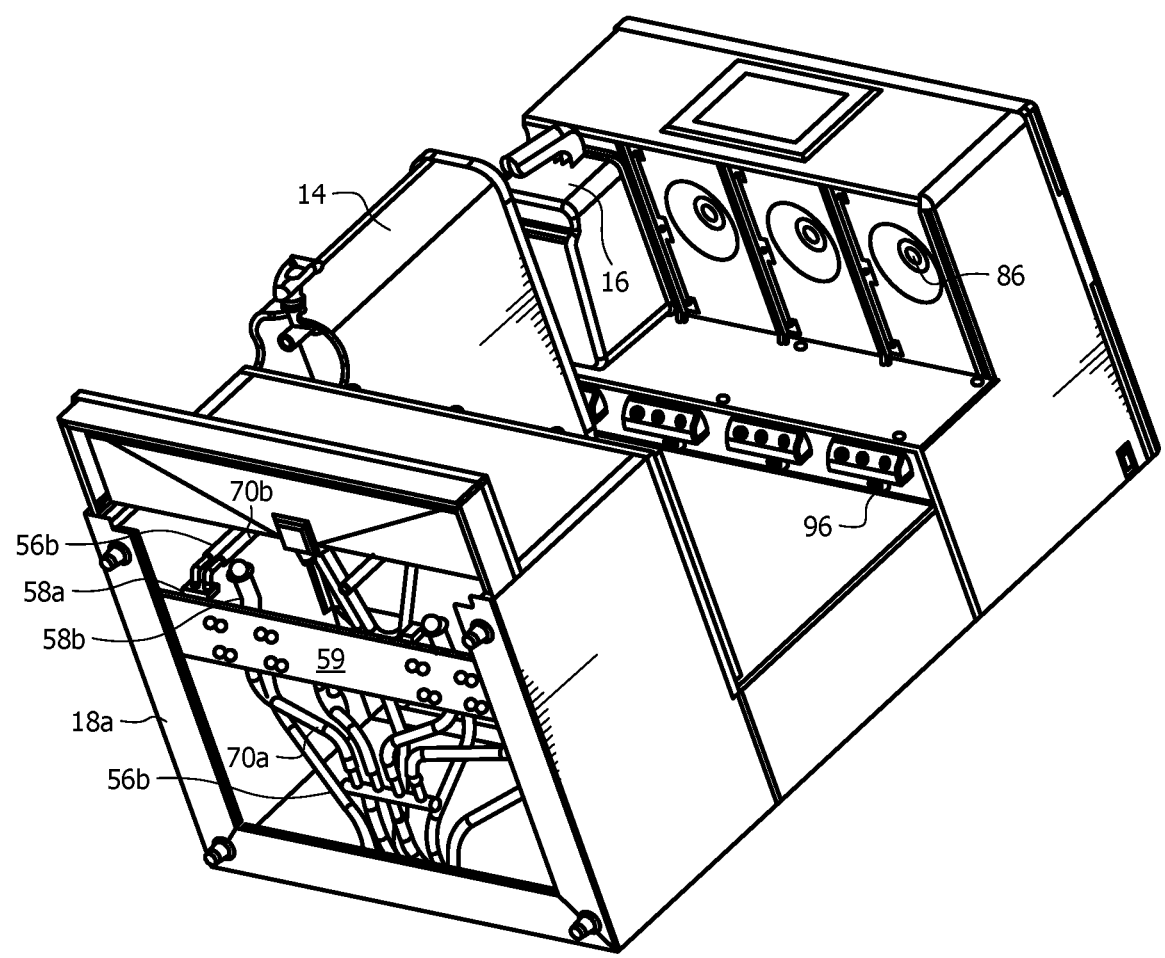
FIG. 2C depicts a bottom front and left side perspective view of a combination unit according to an embodiment of the present disclosure.

Turning now to FIGS. 4A, 4B, 8A, and 8B, brew basket 16 may comprise brew basket body 38 for containing tea bag 17 dimensioned to conform to the interior of brew basket body 38 and for receiving a fluid, such as hot water, as more specifically set forth below. Tea bag 17 may be kept off the floor of the brew basket by ribs, ridges or standoffs 16a. Brew basket 16 may have handle 40 dimensioned for receipt of a hand to grasp and manipulate, such as when changing out tea bag 17. Brew basket 16 is also seen to have upper rim 42, which upper rim is designed to engage rails 20c of upper housing 20 as seen in FIG. 1 to support the weight of the brew basket as it is suspended over the urn. Extending below base 38a of brew basket body 38 is a pair of legs 44 which, combined with the dimensions of feed spout 46, may allow the brew basket to sit level on a horizontal surface. Feed spout 46 is seen to depend below base 38a and may have small feed opening 48, such as a feed opening of approximately 0.082" diameter, may provide for steeped, hot tea fluid into urn 14. Feed opening 48 may be engaged with mesh filter 50 to provide for a clean, filtered steeped fluid passing through feed opening 48. As seen in FIGS. 2A and 2B, combination unit 10 may include hot water tank 51 as set forth in more detail below.

A device according to embodiments of the present disclosure may include a number of fluid flow circuits. With reference to FIGS. 2A, 2B, 2C, 5A, and 5B, and these specifications, these circuits will be described. A first circuit illustrated schematically in FIG. 5A and in FIGS. 2A and 2B may be considered a circuit adapted to direct at least one (and typically more) flow-controlled fluid directly into the urn. In the first circuit, at least one concentrate leg, engaged to a bag in the box or a "BIB" pressurized source (typically outside the housing), may be represented by letters C and D, designating either one of tea concentrate, sweetener or flavor concentrate (or other suitable concentrate). That is to say, pressurized concentrate source C and D may be a tea concentrate and flavor concentrate mix use as set forth below or a tea flavor or sweetener concentrate for use as set forth below, or any other suitable concentrate.

Figure 5A:
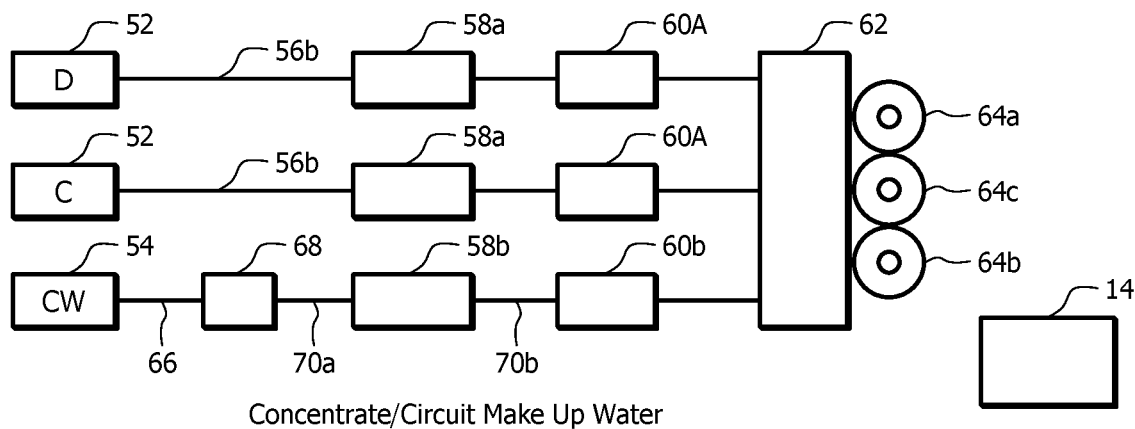
FIGS. 5A and 5B illustrate in schematic for the urn fluid circuit and the fresh brew circuit of a combination unit according to an embodiment of the present disclosure.

One of the first circuits is illustrated in FIGS. 5A, 2A, and 2B. The first circuit may have at least one concentrate leg (beginning at C and/or D) and a makeup water leg (see FIG. 5A). Turning to FIG. 5A, with reference to the concentrate leg, concentrate C and/or D may be a bag and box pressurized concentrate known in the art. Here, C and D is designated numeral 52, which may be used to designate a bag-in-box pressurized concentrate source. Line 56b may carry the concentrate to flow control 58a, which may provide controlled output downstream flow, even when upstream pressure in line 56b may vary. These flow controls are known in the art of bar gun dispensers and typically comprise a spring, sleeve, and piston, etc. Downstream of flow control 58a, the concentrate is carried in line 56b to solenoid 60a, which is controlled by a control circuit as set forth in more detail below, to block 62 having injector 64c thereon.

Figure 7:
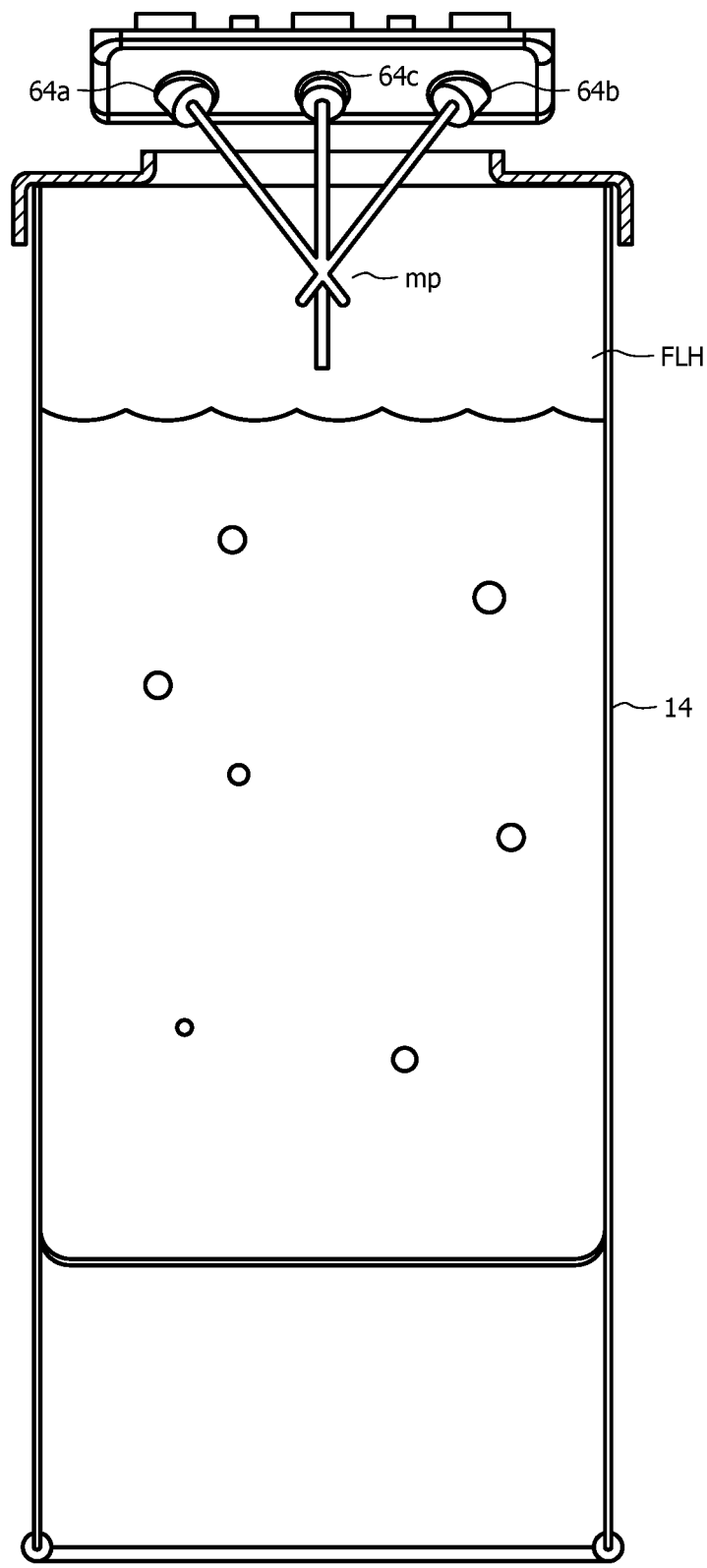
FIG. 7 depicts a block at one of the stations showing the manner in which injectors of the block are directed towards one another according to an embodiment of the present disclosure.

The first circuit (FIG. 5A) may include a water leg comprising, typically, city water. City water 54 is typically pressurized and carried in line 66 to, optionally, manifold 68. Manifold 68 (see FIG. 2A) may have a number of output lines (such as four (one for each station)), and one line 70a will carry pressurized city water to flow control 58b. Downstream of flow control 58b is line 70b, which carries water, in a volume controlled flow, to solenoid 60b. All solenoids are normally closed and are controlled by control board 88 and microprocessor as set forth in more detail below. When solenoids 60a/60b are opened, pressurized flow will pass through block 62 to injector 64a/64c (concentrate) and 64b (makeup water) for injection into the urn. Injectors 64a/64b are directed such that their fluid streams will intersect (converge) in the interior of the urn, typically above a high fluid level $F_{LH}$ (see FIGS. 7 and 9).

Flow controls 58a/58b may be adjusted for flow volume in ways known in the art for the proper ratio or brix between amount of concentrate C and/or D and amount of makeup water. For example, there may be a 5 to 1 ratio between water and a tea concentrate.

Typically, but not necessarily, there may be four first circuits (concentrate and makeup water legs) each similar to that illustrated in FIGS. 5A, 2A, and 2B. They may have the same or different bag in box sources A/B/C/D, and each may be able to, through manual adjustment of flow controls and the timed circuits from the control board, provide a proper mix ratio of concentrate to makeup water and, if used, steeped fluid, each providing for dispensing into an urn placed adjacent or below block 62.

Figure 5B:
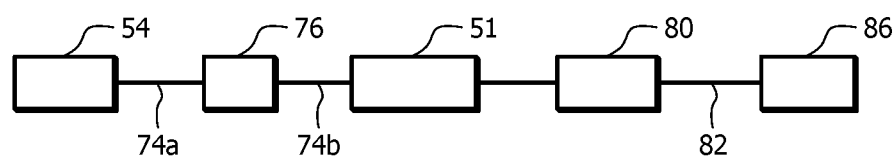

FIG. 5B illustrates a second circuit or fresh brew hot water circuit according to an embodiment of the present disclosure. The fresh brew hot water circuit is provided for allowing the option of providing a fresh brew tea rather than a bag in box concentrate tea (flavored or unflavored, sweetened or unsweetened). The fresh brew circuit may provide water heated in hot water tank 51 to injector 86 placed above each of the four brew baskets 16. The brew baskets, if the fresh brew circuit is selected, will contain tea bag 17 (see FIG. 4A) selected for the appropriate volume of fresh brew tea, a maximum given by the size of the urn beneath the brew basket. Hot water tank may include drain 51b with stop clip 51c engaged therewith and plug 51e at the end.

Figure 2D:
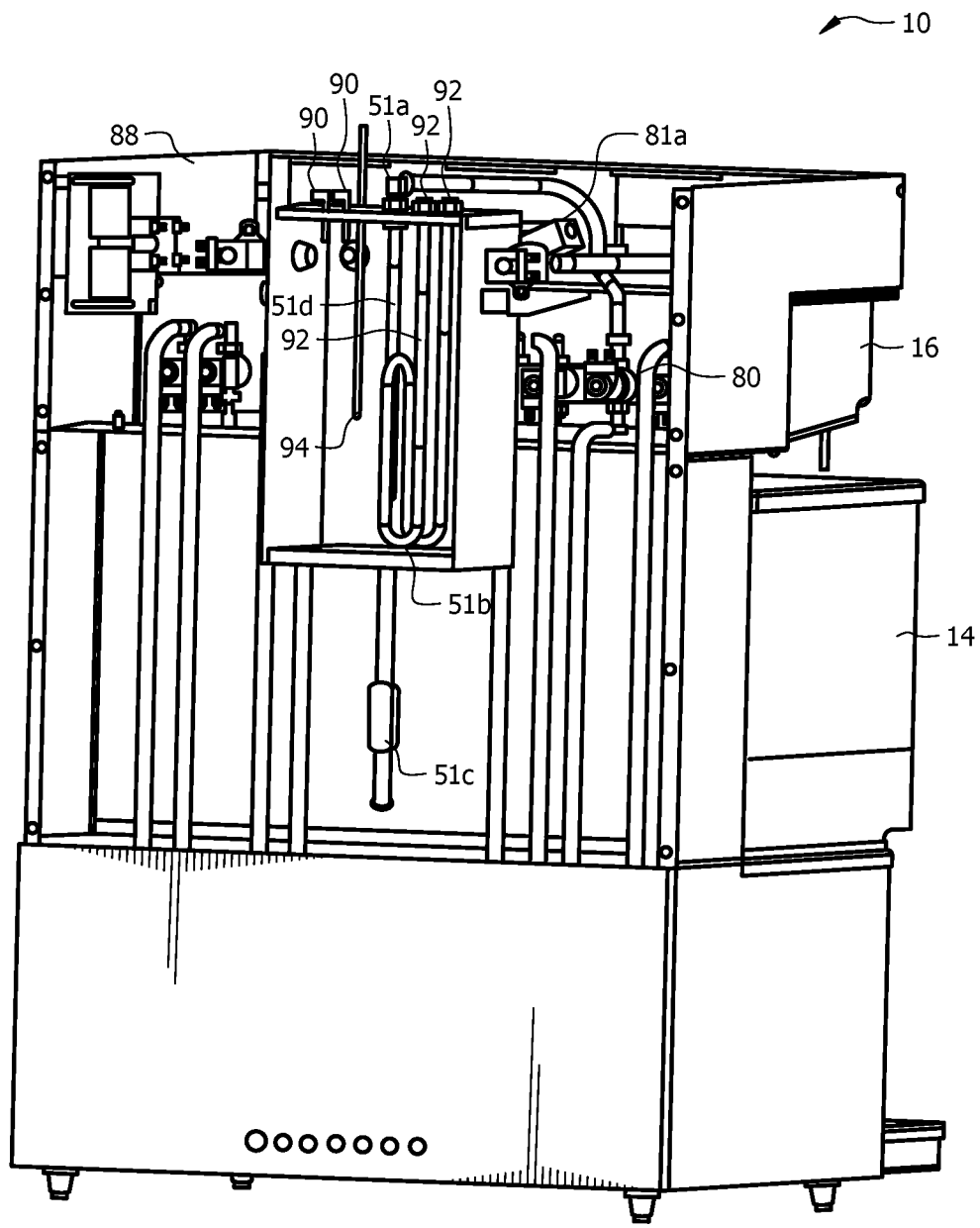
FIG. 2D depicts a rear right side perspective view of a combination unit with the rear housing panels removed and showing the interior of the hot water tank according to an embodiment of the present disclosure.
Figure 3A:
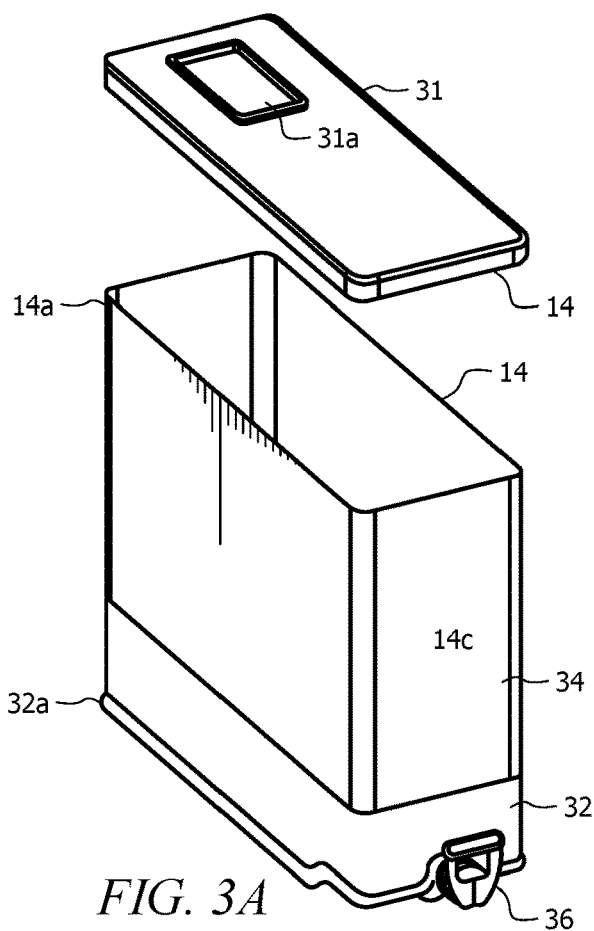
FIGS. 3A and 3B depict perspective views of an urn according to an embodiment of the present disclosure.
Figure 3B:
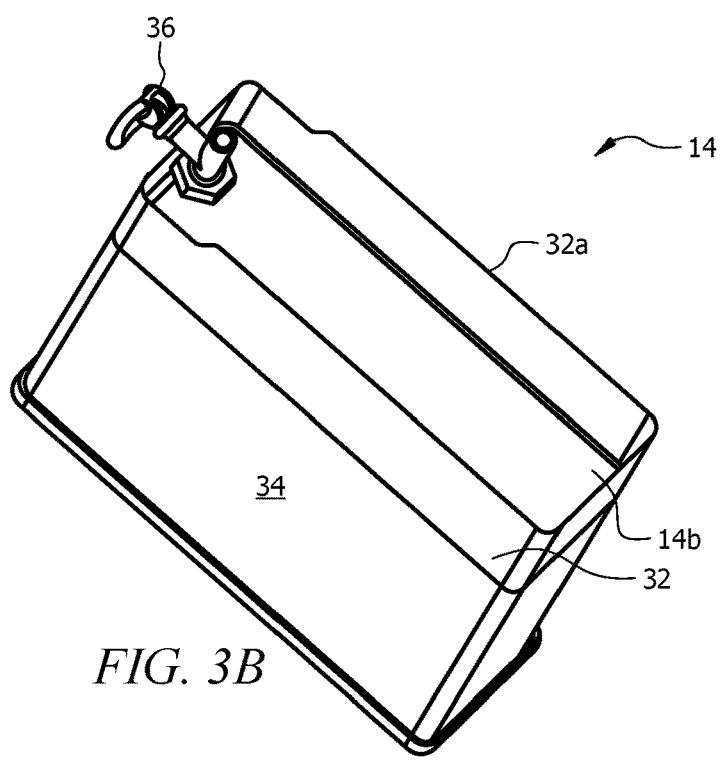
Figure 4A:
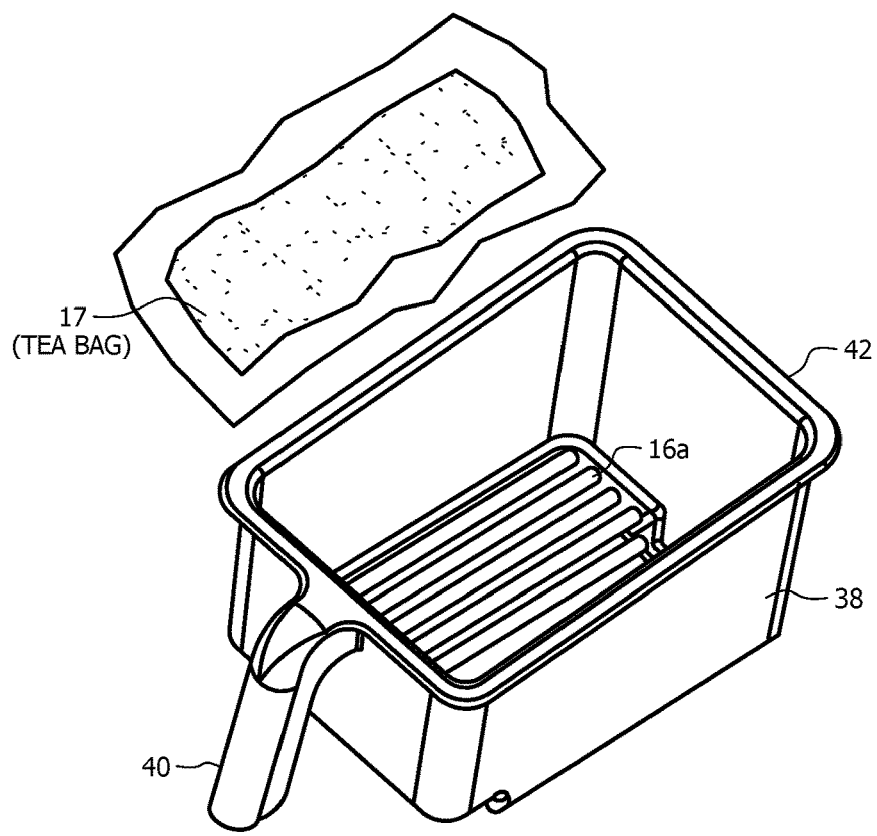
FIGS. 4A and 4B depict perspective views of a brew basket (without a tea bag) according to an embodiment of the present disclosure.
Figure 4B:
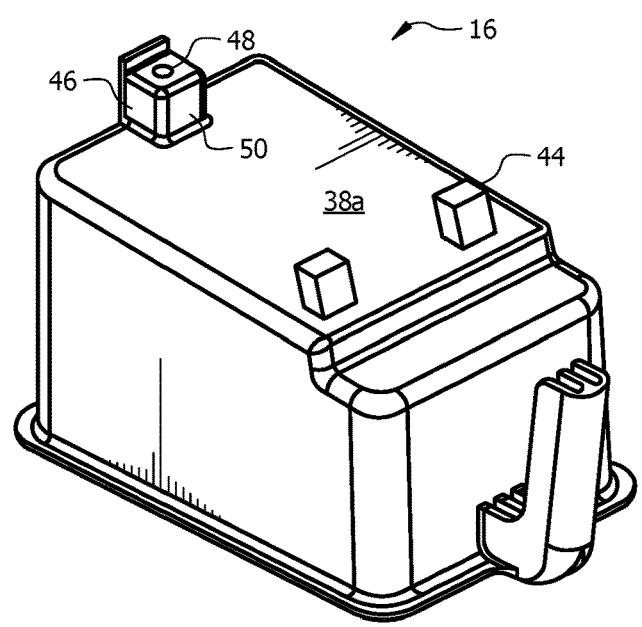

With reference to FIGS. 2A, 2B, 2D, 5A and 5B, fresh brew hot water circuit may receive pressurized water 54 through line 74a (which may or may not bypass manifold 68—here it is shown bypassing manifold 68). Water may be provided to flow control 76 through line 74a. Downstream of flow control 76, line 74b may take flow controlled water to a hot water tank fill solenoid 80, then to hot water tank 51 at inlet 51a for heating as set forth in more detail below. Inlet water tube 51d (FIG. 2D) may release the water near the bottom of the tank and adjacent the heating element 92 as seen in FIG. 2D. Engaged with output line 82 of the gravity fed water from hot water tank 51 are solenoids 81a/81b/81c/81d (see FIG. 2B). Downstream of solenoid 81a, line 82 carries heated water by gravity feed, to plate 84. Each of the four solenoids controlling hot water tank flow to injectors 86 may have line 82 downstream to engage solenoids 81a/81b/81c/81d.

Plate 84 may have injector 86 mounted above the brew basket as seen, for example, in FIGS. 1 and 2B. Injector 86 may allow hot water to flow, under gravity, to brew basket 16. Solenoid 81a, in the manner set forth below, may allow the controlled flow of gravity-fed hot water, to be received in brew basket 16 (which may contain leaf tea or a tea bag) for a controlled amount of time (cycling open normally closed solenoid 81a). Knowing the accurate gravity feed flow rate (given head of tank water level above injector 86), the control board is programmed to provide a time cycle to normally closed solenoid 80 to allow it to be opened for a precise period of time, which will allow a precise volume of hot water delivered to brew basket 16. This controlled volume of hot water is the steep water (creating a strong tea mix) and will only be a fraction of the water provided to the urn. Indeed, unheated "makeup water" may be provided from the makeup water leg illustrated in FIG. 5A above. For example, if 96 oz. of steep water (for creating hot, strong tea in the brew basket) is provided through fresh brew circuit illustrated in FIG. 5B to brew basket 16, makeup water may be, for example, 3 gallons less the 96 oz. This makeup water is provided through injector 64b by the timed cycling of solenoid 60b; if the fresh brew circuit is selected, to provide a total of 3 gallons of fresh brewed tea in urn 14 as situated below the brew basket chosen for the fresh brew circuit.

If the fresh brewed circuit of FIG. 5A is selected, not only is makeup water at ambient temperature be provided from the water leg of the first circuit of FIG. 5A, but a flavor (for the fresh brew) may be provided at bag in box C/D2, for example, a sweetener for the hot brewed tea. The first circuit carrying the bag in box tea concentrate may carry at C/D, instead or in addition a sweetener, in pressurized bag in box form for use with a fresh brewed circuit. In such a manner, both makeup water, through injector 64b and flavor through injector 64a or 64c may be provided when a fresh brew circuit is chosen as set forth in more detail below and the sweetener option in bag in box form, placed at C/D as illustrated in FIG. 5A.

There may be a plurality of electronic control circuits whose functionality is set forth in more detail below. These electronic control circuits are controlled generally from control board 88 containing a microprocessor (not shown). First, there is a station/choice control circuit. This control circuit may include the manual input and display boards 41a/41b/41c/41d (for example, via touch screen), typically one for each station or a single input and display, which can manually output signals to control board 88. Manual input and display boards 41a/41b/41c/41d are typically located just above the brew baskets/urn combination at that station that it is intended to control. In an alternate embodiment, a single manual input and display board 41 may be used (see FIG. 1). In the station/choice control circuit, the user may input at a selected one of four stations, make a selection of a fresh brew or concentrate circuit, go to the second, go to the third, and finally to the fourth station, choosing at each station whether or not the beverage choice will be fresh brewed tea (which may be with or without flavor concentrate) or concentrate made tea (bag-in-box). Optionally, the system may have a beverage strength option (strong, regular, mild) for beverage strength control. Optionally, also, a beverage volume control may be input (small volume, medium volume, and full urn of beverage volume). This uses less makeup water for different volumes or stronger/weaker mixes. A microprocessor in control board 88 is programmed in ways known in the art for the control circuit input to receive input from the input and display board 41, 41a/41b/41c/41d and to output selections to the timed solenoid cycles as more specifically set forth herein.

By way of example, station A (leftmost in FIGS. 1-2D) may be selected by the user and a choice of fresh brew tea may be made. The microprocessor will respond to a start cycle (start/stop button 59) by opening normally closed solenoid 80 for a period of time sufficient to deposit a first volume of hot water in the brew basket at station A. The microprocessor may measure a delayed time sufficient for the hot water to steep in the bagged tea in the basket and, typically for at least one of the steeped tea, to drain through feed opening 48 into the urn below.

Following the opening and then closing of solenoid 80 and typically following the time delay sufficient for some of the hot water to have steeped and drained into the urn below, normally closed solenoid 60b will open for a period of time sufficient to deposit a second volume of unheated or "makeup" water into the urn to mix with the first volume of steeped water. The first volume of steeped, hot fluid plus the second volume of unheated makeup water may substantially equal the desired beverage volume.

If chosen via user (input), the optional flavor and/or sweetener circuit may be opened for a time period sufficient to sweeten or flavor the beverage volume, such time period to preferably be within the time period that solenoid 60b (makeup water) is opened—ensuring simultaneous flow of the flavor or sweetener and makeup water and proper mixing thereof.

Turning now back to station A, in the next example, instead of a choice of fresh brew being made, the user has placed a bag-in-box tea concentrate at C/D and has input the "concentrate choice" (rather than fresh brew) mode at station A.

The microprocessor thereafter responds to the start cycle (via user input) by opening solenoid 60b for a period of time to deposit a first flow controlled volume of water through the injector into the urn (not into the brew basket). This period of time may also be responsive to beverage volume control (for a strong, regular or mild beverage strength). Typically, while solenoid 60b is opened, solenoid 60a will also be open for a period of time (usually less) to deliver sufficient tea concentrate to the beverage volume. This period may also be responsive to either the optional beverage strength or beverage volume control. Additionally, a flavor and/or sweetener circuit may provide flavor and/or sweetener to the urn.

A temperature control circuit operates through the microprocessor and control board 88. Its function is to maintain temperature in hot water tank 51 between a preset high and a preset low temperature limit (for example, 195-205 degrees Fahrenheit). The temperature control circuit may include heating element 92, temperature sensor 94 on heat tank 51 (see FIG. 2D). Periodic monitoring of sensor (temperature probe) 94 input may allow the control board 88 to control current to heating element 92.

Flow control as set forth herein is typically adjustable to control the ratio of the mix; that is, concentrate to water on the first circuit. However, controlling the ratio of the mix may also be achieved by varying the solenoid open time periods. For example, if a 5 to 1 mix is required, between water and concentrate, a flow control of water at five times the rate of the flow control of a concentrate will achieve such a mix, so long as the time period of the solenoids in their open condition is the same for both the water and the concentrate. On the other hand, if the flow control were adjusted so that the rate of flow of the concentrate and the water were the same, then to achieve the 5 to 1 ratio, the solenoid for the water would be open for five times the period of the solenoid opening for the concentrate. Variations between these extremes may be provided. Typically, however, the period of time is controlled such that the flow of the concentrate is within the time period of the flow of the water. Moreover, as can be seen with FIG. 7, it is seen how the two injectors 64a/64b or three injectors 64a/64b/64c may be directed toward one another so that the stream of the makeup water and the concentrate(s) mix at a mid-point mp, which mid-point is typically above the highest level of fluid intended to be deposited in the urn and below upper rim 14a of the urn. This mid-stream mixing is designed to achieve a more thorough co-mingling of the two or three fluids as the case may be.

The control board may also be programmed for a water-only circuit. That is to say, the water leg may be opened while all the other solenoids are shut down to provide ambient water only through injector 64b to the urn.

While tea is a beverage that may be fresh brewed, other beverages are also possible, such as, for example, bagged coffee or loose ground coffee using a filter and a drip mode. Moreover, there is also, in one embodiment, a single station wherein the combination is the ability to either fresh brew, with makeup water and optionally flavor, or to concentrate mix the dispensed beverage.

A tank fluid level control circuit may be provided to maintain proper fluid level in hot water tank 51 (water level above the four outlets and substantially covering the heating element). At this point, it is noted that the four outlets of tank 51 are also above injectors 86, to allow gravity flow of the hot water into the brew basket. Voltage may be measured at the control board to water level sensor 90 mounted on top and depending into the hot water tank (FIG. 2D). Microprocessor and control board 88 may be set to detect the presence of fluid or lack of fluid (the resistance change affecting voltage). The microprocessor will keep the water above the water outlets of hot water tank 51 covered and also substantially covering heating element 92 immersed therein. If the fluid level drops below a minimum water fill, solenoid 80 may be open for a period of time sufficient to deposit water to just below the maximum fluid level, as detected by the sensors.

There may be three injectors just above the urn, typically above the upper rim. That is to say, while some embodiments use two injectors for injecting fluid into the urn, three may be provided. For example, the first circuit, besides having makeup water leg, may include a concentrate leg having a flavor (such as lemon or raspberry) and a concentrate leg having a sweetener as seen in FIG. 5A. In such a circuit, only fresh brewed tea is available, with the makeup water being provided as set forth hereinabove, and both a flavor and a sweetener through the second and third injectors—the makeup water, flavor, and sweetener for injecting directly into the urn.

On the other hand, in a first circuit, there may again be three legs, again a makeup water leg, but a second (concentrate) leg being bag in box tea (leg), and a third (concentrate) injector along with a third circuit having a concentrate sweetener.

In addition, there may be level sensors 96 for indicating the level of fluid in urn 14. It may be an optical level sensor or an ultrasound level detector, and positioned over an at least partly open urn. One such level sensor is Part No. QS180PA, 12-30 VDC, available from Banner Engineering, Pennsylvania, an ultrasound level detector. This level sensor is a "one position" sensor and may be typically engaged to the control circuit and microprocessor. A one position level sensor will continuously monitor the level of fluid in the urn and, when it hits a preset low position, will signal an action, such as "re-brew." This may generate solenoid commands as programmed—usually to begin a fresh brew or concentrate cycle.

There may be multi-position sensor and microprocessor combinations, where the sensors monitor the fluid level and the microprocessors include algorithms for certain flow control actions to occur at specified levels. For example, there may be a detection of a "no container" position, in which the algorithm may generate a "no flow" (also solenoid closed) or "no fluid" position.

A unit according to embodiments of the present disclosure may be multi-functional in that it may be adapted to brew fresh brewed, concentrate tea or a combination, with all circuits at least providing makeup water separately in an urn. Makeup water as set forth herein means water added to either a steeped fluid in the hot brew circuit or a concentrate bag in box tea for a concentrate brew circuit.

When the unit is configured for only fresh brewed tea, then only the fresh brewed circuit and the water leg of the first circuit need be provided. Optionally, a concentrate leg may also be provided in the first circuit to add a flavor and/or sweetener.

If the unit is to be configured as a concentrate beverage only, then no fresh brewed circuit is required and only the first circuit, with at least a water leg and a concentrate leg for the bag-in-box tea concentrate, and, optionally, an additional concentrate leg for a flavor or a sweetener, may be provided. Typically, a unit according to embodiments of the present disclosure may be configured to provide both fresh brewed and concentrate and may have two or more stations as necessary.

There may be a safety circuit operating with the temperature control circuit in which a fluid level drop to below a minimum fluid level on the tank will automatically shut off energy to the heating element 92.

It may be noted that there is no mixing nozzles or no mixing at all of water with any concentrate where such mixing occurs anywhere but in the urn interior or brew basket. That is, the machine has no point within it, not in the nozzles or upstream of the nozzles, where there are concentrates (whether tea concentrate or a flavor or a sweetener concentrate) and water mixing. Other than non-electrical flow control devices and the solenoids, there are typically no electrical elements, such as electrical valves or pumps. All mixing is done downstream of the machine, in the urn or above the fluid level in the urn.

Figure 8A:
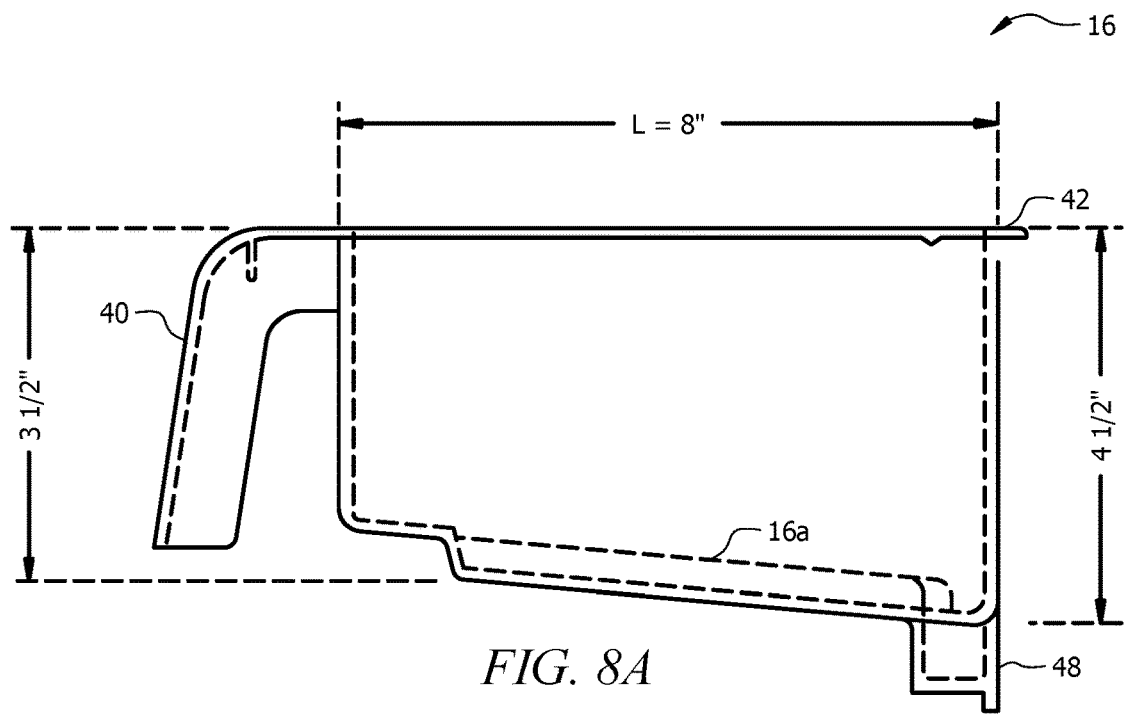
FIGS. 8A and 8B depict side elevational and front views of a brew basket, including some representative dimensions according to an embodiment of the present disclosure.
Figure 8B:
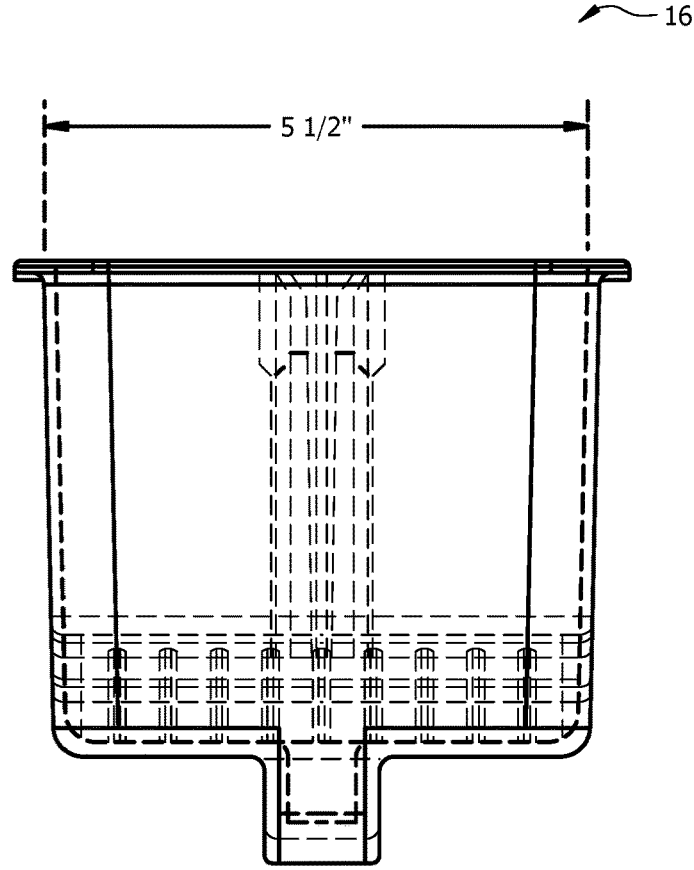

FIGS. 8A and 8B illustrate side and front views of a brew basket for use with a tea dispenser according to an embodiment of the present disclosure. A sloped floor is shown with upstanding elements provided to allow drainage to feed opening 48.

Figure 10:
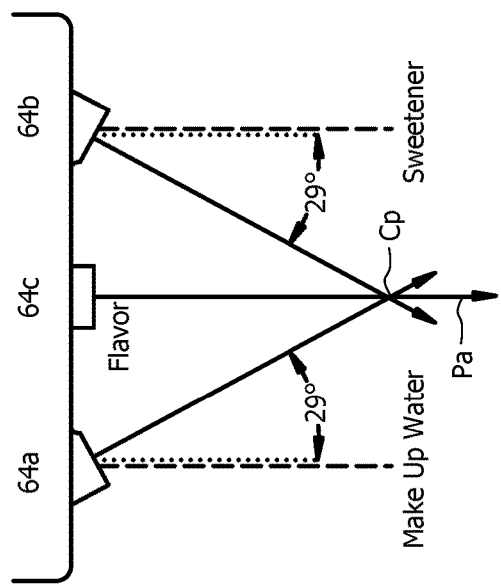
FIG. 10 depicts a top elevational view showing the injectors directed towards one another and over an urn according to an embodiment of the present disclosure.
Figure 10:
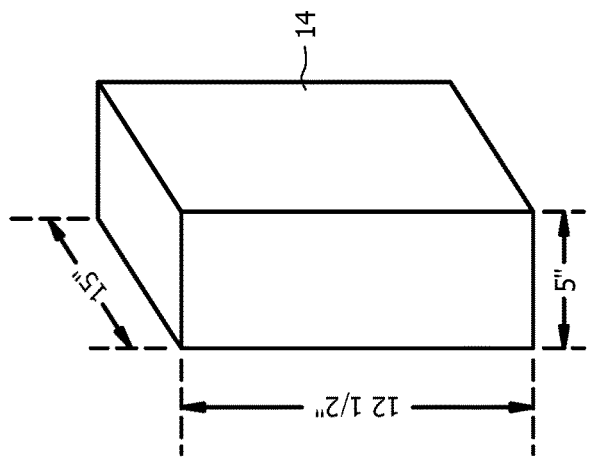
Figure 9:
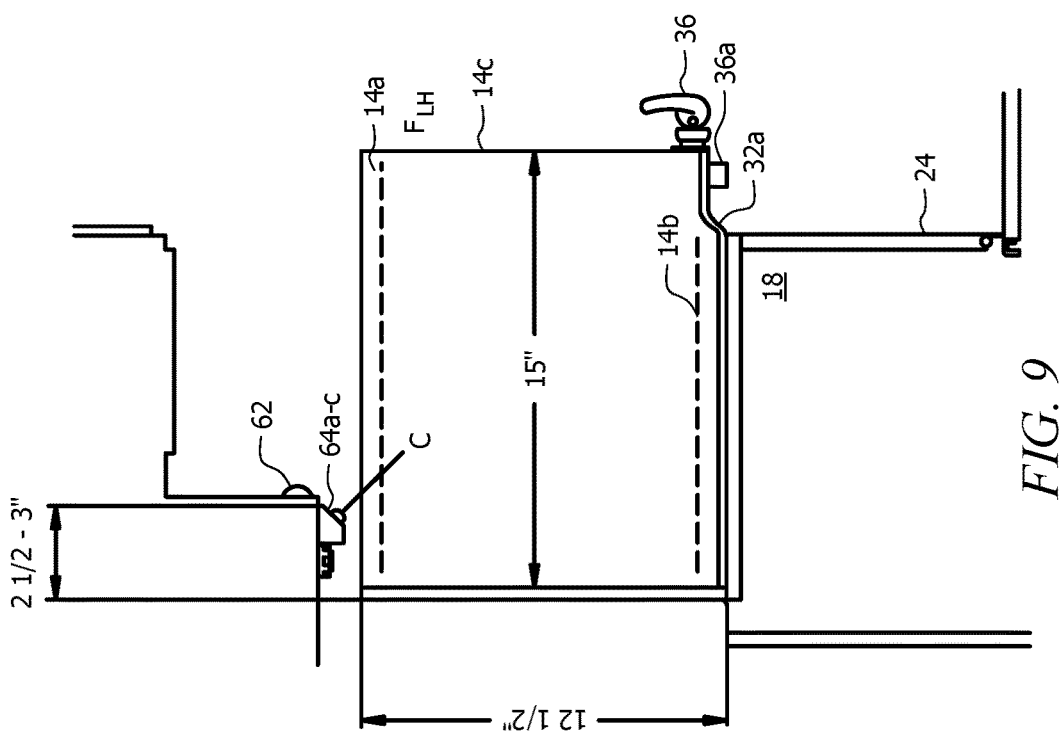
FIG. 9 depicts a side elevational view showing a housing with the urn and the injectors positioned above and within the upper rim of the urn according to an embodiment of the present disclosure.
Figure 10A:
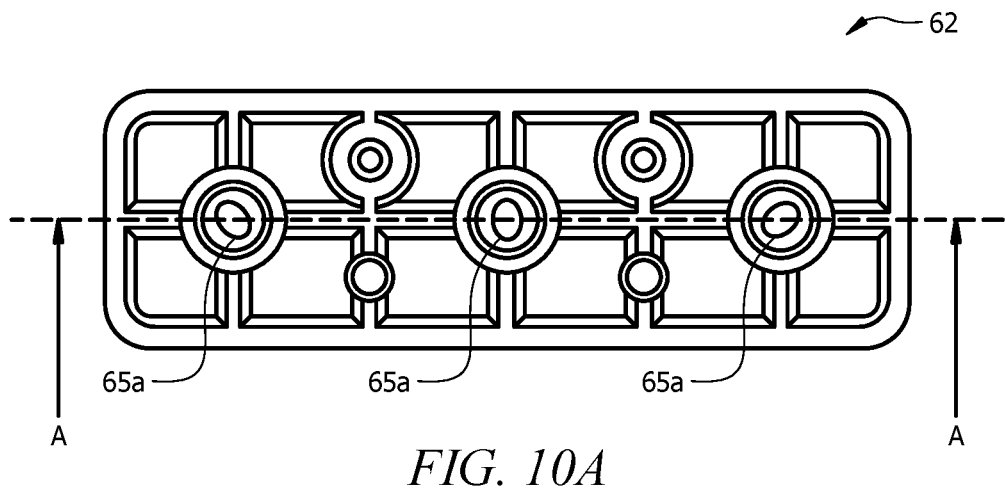
FIGS. 10A, 10B, 10C, and 10D illustrate top elevational, front cross-sectional, front elevational, and side cross-sectional views of a nozzle according to an embodiment of the present disclosure.
Figure 10B:
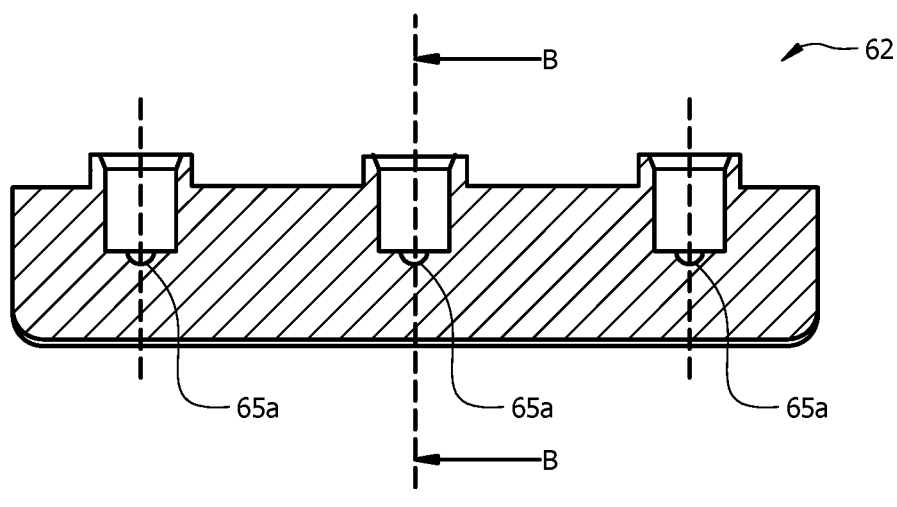
Figure 10C:
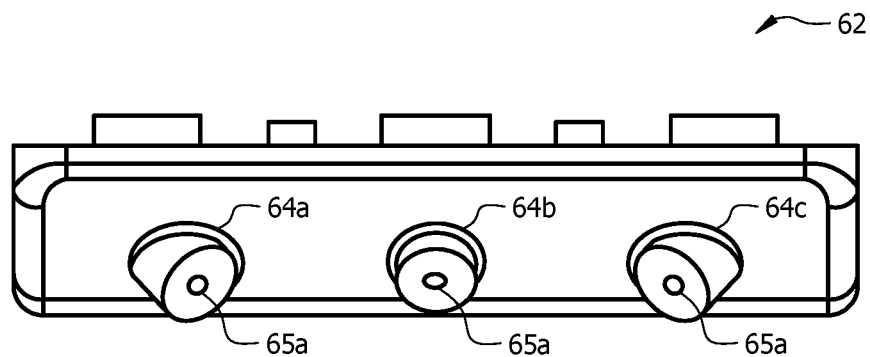
Figure 10D:
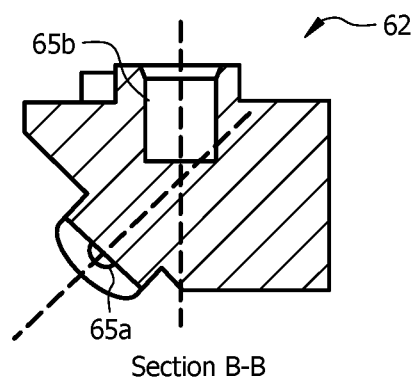

FIGS. 9 and 10 illustrate the manner in which block 62, having multiple injectors thereon, may be positioned, typically above upper rim 14a of an urn. It is also seen that removed end 36a (from which fluid is dispensed) of valve assembly 36 may be recessed both back from front wall 14c of the urn and up from the portion of lower lip or perimeter 32a that engages base 18.

If there is a lid or top 31 on the urn, typically the injectors are positioned above opening 31a of the lid and having the direction set so the flow is through the opening in the top of the lid of the urn. It is seen with reference to the FIGURES that, with respect to a principal axis Pa, which is seen in the view of FIG. 9, to be horizontal and straight, and in FIG. 10 to split the block bilaterally so that there are injectors on either side equidistant from the center. It is seen in FIG. 9 that the injectors typically direct the pressurized fluid flow downward at an angle C with respect to the principal axis.

In FIG. 10, it is seen that the injectors that are on either side of the principal axis direct the fluid flow toward the principal axis in the view set forth in FIG. 10. Angles with respect to angle C and angle B may be in the range of about 15" to 70"; angle C (FIG. 9) about 15 degrees to 90 degrees (straight down) or any other suitable angle such that the 2 or 3 streams are directed at a conveyance point Cp within the urn interior. Preferably, the point is within the interior, below the urn upper rim (for example, about an inch below), but in an alternate embodiment, the nozzles may be directed to a point above urn upper rim 14a. Typically, the nozzle directs the flow toward a convergence point that is above $F_{LH}$ and below the rim and within the interior. In an alternate embodiment, nozzles 64a/64b or 64a/64b/64c are directed to convergence point Cp.

FIGS. 10A, 10B, 10C, and 10D illustrate further details of nozzle 62 according to an embodiment of the present disclosure. It may include walls defining directed channel 65a, for each of injectors 64a/64b/64c, which are directed to a convergence point Cp as set forth herein. It is also seen to include walls defining engagement port 65b for engagement with the removed ends of the makeup water legs and the one or two concentrate legs as set forth herein.

Figure 11:
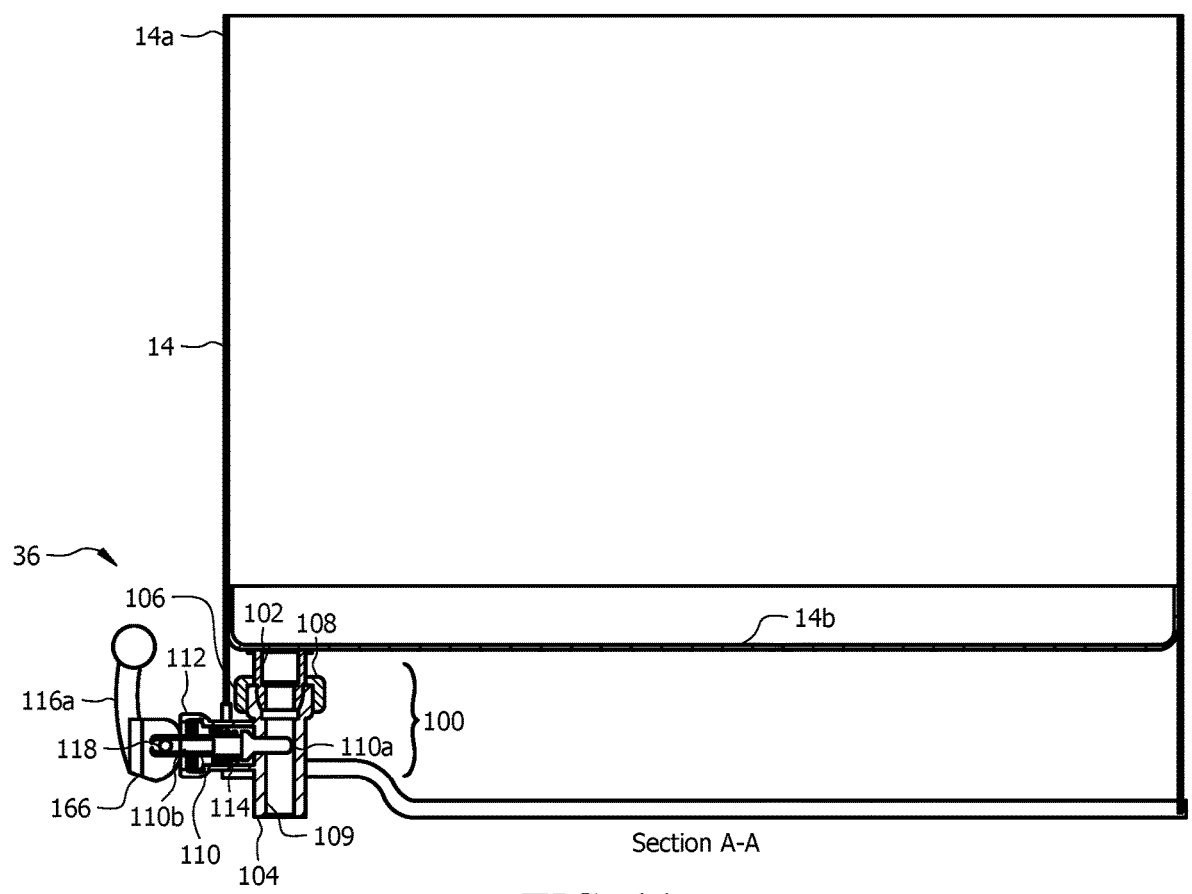
FIG. 11 depicts a side cross-sectional elevational view of the urn through the valve engaged therewith according to an embodiment of the present disclosure.
Figure 12:
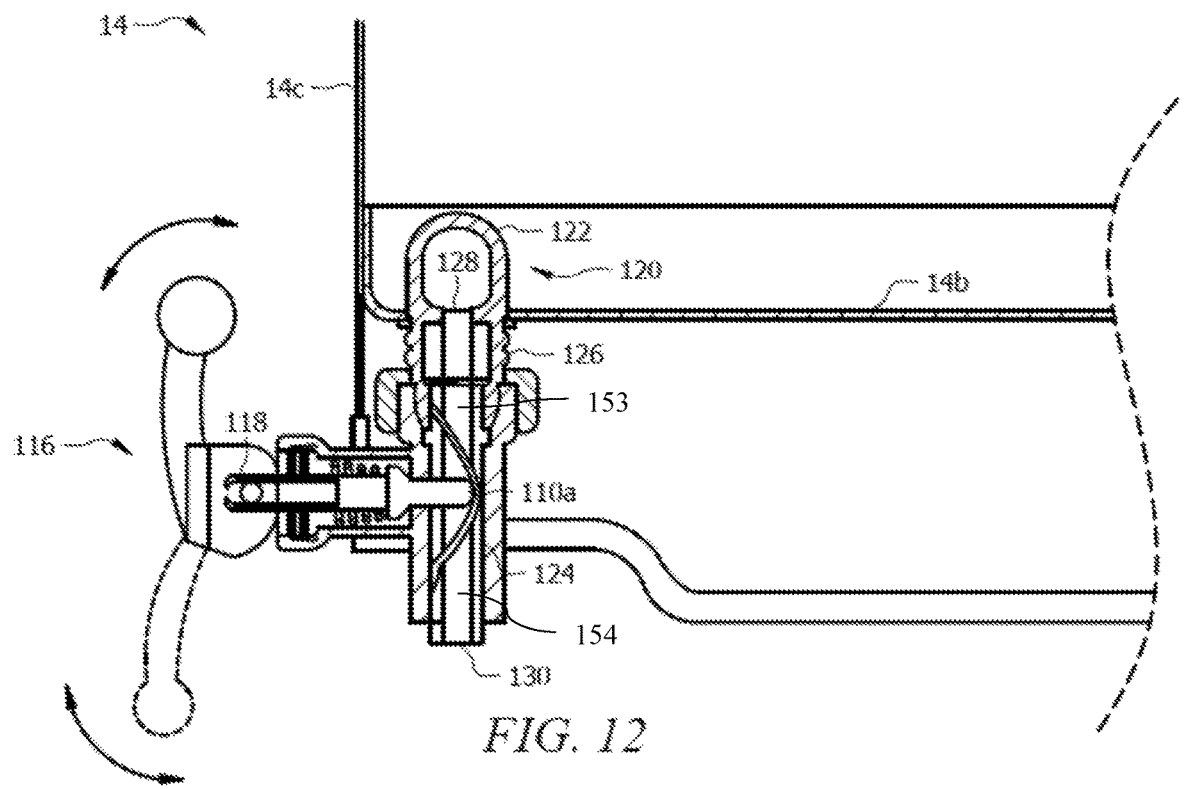
FIG. 12 depicts a closeup cross-sectional view of a valve for use with an urn for use with a tea dispensing machine, with the pinch member pinched or closed, according to an embodiment of the present disclosure.

Dimensions for urn 14 are given and are approximate; the maximum dimension is typically up to about 15 inches or less. FIGS. 11 and 12 illustrate urn 14 with upper rim 14a and floor 14b. Urn 14 may include valve 36 typically engaged to the floor thereof.

In FIGS. 11, 12, 12A, 12B, 13, and 14, valve assembly 36 may include down spout assembly 100, typically projecting generally vertically downward from floor 14b of the urn, close to the front side wall thereof. Moreover, it is seen that down spout assembly 100 may include floor engagement member 102 fluidly sealed to the floor. Body 104 extending downward thereof may be coupled to the removed end of floor engagement member 102 with coupling member 106. O-ring or other sealing means 108 may be used between the removed end of floor engagement member 102 and the upper end of body 104. Threaded engagement may be provided to pull the two members tightly together in fluid sealing relation. Body 104 may be vertically situated and has walls defining an inner channel and walls defining slot 109 therein between a near and removed end of the body. Lateral member 112 having a channel open to the body may extend laterally or horizontally outward from the body and may substantially enclose slot 109. Lateral member 112 may be configured to engage handle 116 in the manner set forth below. Moreover handle 116 may be substantially outside of floor spaced apart from the front side wall of the urn as seen in FIGS. 11 and 12, so as to provide easy access thereto. Handle 116 may include upstanding member 116a and cammed pin engaging member 116b.

Pinch member 110 may include pinch arm 110a dimensioned to extend therefrom and adapted to extend at least partially into a channel defined by body 104. Pinch member 110 may also include slot 110b for engaging pin 118, the pin extending through to spaced apart portions of pin engagement member 116b.

Figure 12A:
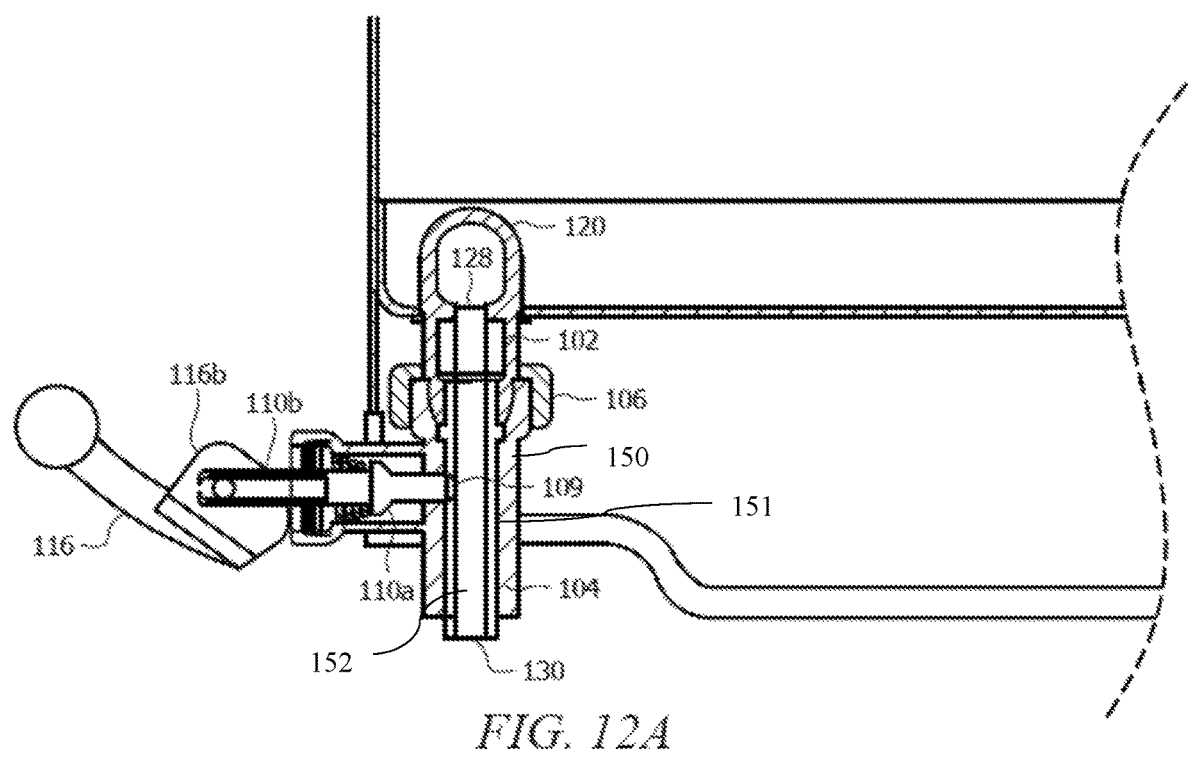
FIG. 12A depicts a view as in FIG. 12, with the pinch member in an open or flow condition according to an embodiment of the present disclosure.
Figure 12B:
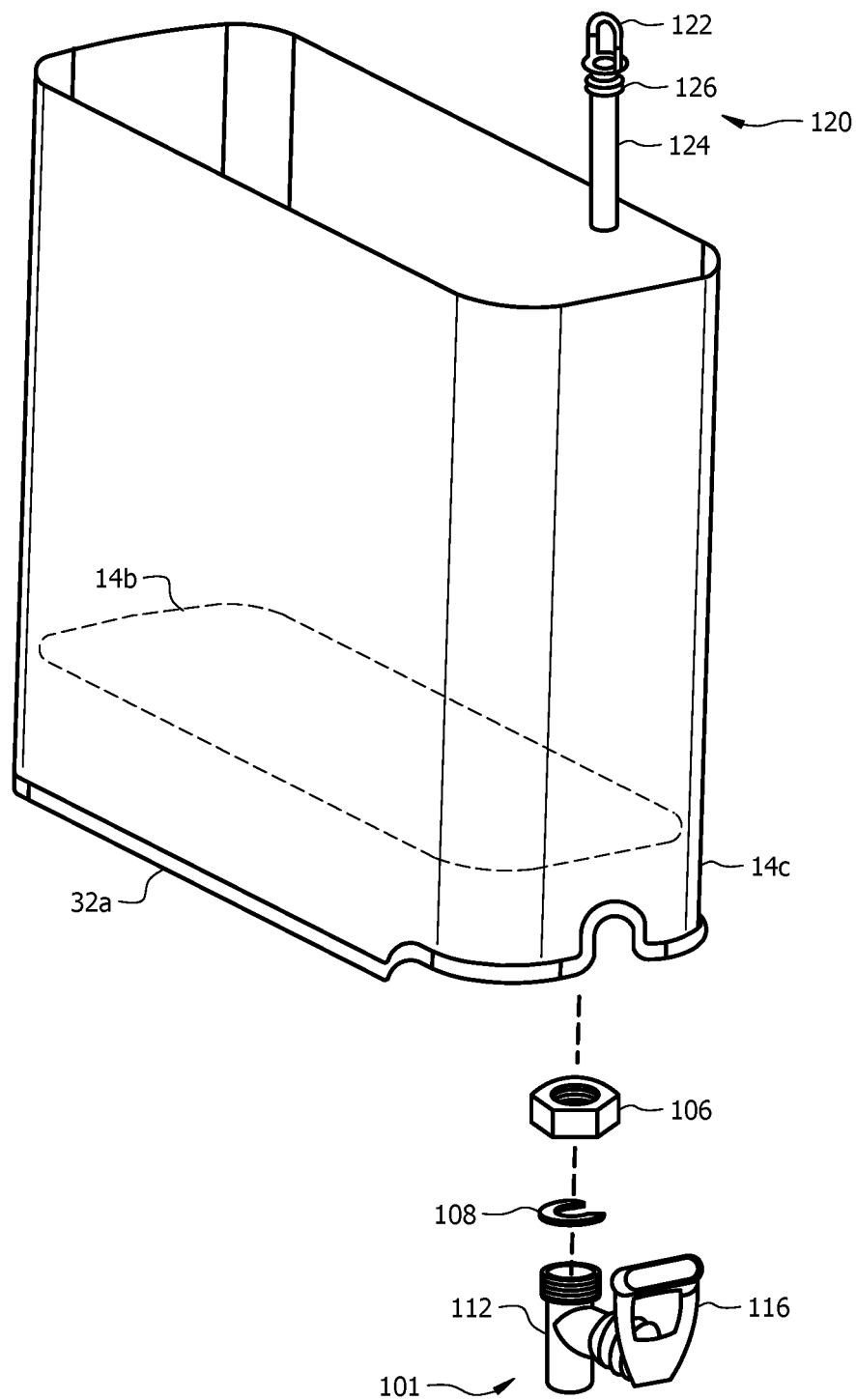
FIG. 12B depicts an exploded view of an urn and valve assembly according to an embodiment of the present disclosure.
Figure 13:
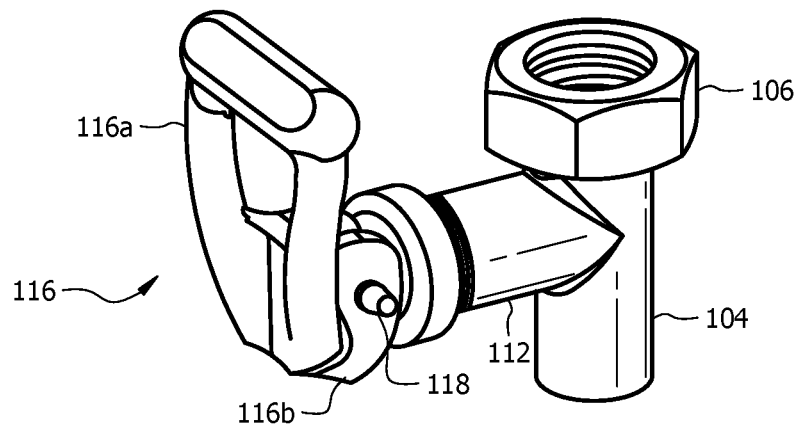
FIGS. 13 and 14 depict external perspective and side elevational views of a valve for use with a tea dispenser according to an embodiment of the present disclosure.
Figure 14:
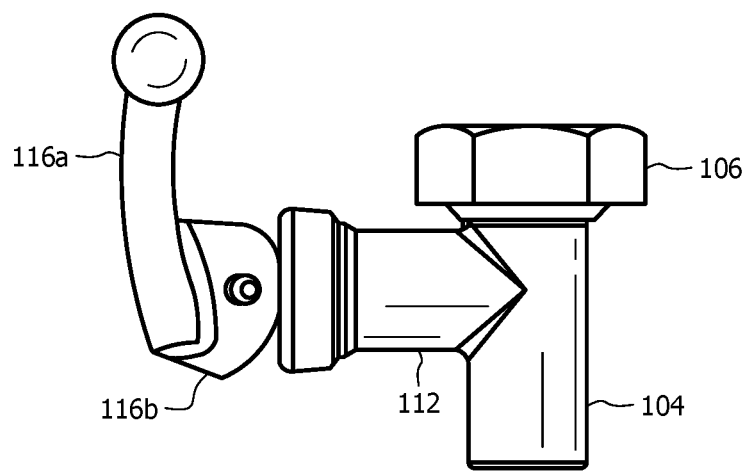

Turning now to FIGS. 12, 12A, and 12B, an additional element of valve assembly 36 according to an embodiment of the present disclosure is illustrated. Valve body 104 may include outer walls 150 that give its shape and allow it to fit into urn 14. Insert 120 may be a pliable, flexible member dimensioned to couple with down spout assembly 100. Insert 120 may include handle 122 engaged with body 124. Handle 122 and body 124 may be integrated and form a flexible fluid tight element. Ring extensions 126 may project outwards from the outer walls of body 124 to resiliently grip inner walls 151 of body 104. Body 124 may include walls defining inlet 128 and outlet 130, and channel 152 therebetween. The walls defining body 124 may be dimensioned to couple closely and adjacent to inner walls 151 of body 104. Pinch arm 110a engages the outer wall of body 124 that lay adjacent slot 110b. Pin engagement member 116b may be cammed or configured to allow handle 116, in a first position to urge, under the impetus of coil spring 114 against the insert as seen in FIG. 12. Pinch arm 110a to the pinched position as seen in FIG. 12 or, in a second position, retract pin arm 110a at least partially so as to allow the flow of fluid through channel 152 of insert 120, as seen in FIG. 12A. When pinch arm 110a is in the pinched position as seen in FIG. 12, channel 152 may be divided into upper portion 153, where liquid stays, and lower portion 154.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A valve for engaging a beverage container, the valve comprising:
   a beverage container body having a top container opening;
   a valve body with outer walls and inner walls defining a channel through the valve body, the outer walls and the inner walls having a slot between an upper portion and a lower portion of the channel;
   a flexible elastomer insert dimensioned to tightly fit against the inner walls defining the channel, the flexible elastomer insert having an open top extending beyond a top of the valve body and an open bottom extending beyond a bottom of the valve body;
   one or more ring extensions that project outward from outer walls of the flexible elastomer insert to resiliently grip the inner walls of the valve body;
   an insert handle integrated with the flexible elastomer insert,
   wherein the flexible elastomer insert is configured to completely separate from the valve body, and wherein the flexible elastomer insert is configured to be removed from the top container opening without remaining attached to another component of the valve; and a pinch member configured to engage with the flexible elastomer insert, the pinch member and the flexible elastomer insert arranged to seal the valve by shutting off and closing any fluid flow through the channel when the pinch member moves into the slot and the flexible elastomer insert is pinched.

2. The valve of claim 1 further comprising:
a pinch handle arranged to move the pinch member in and out of the slot, and wherein as the pinch member moves out of the slot, the fluid flows under the impetus of gravity between the open top and the open bottom of the flexible elastomer insert.

3. The valve of claim 2 further comprising:
a pin engagement member that urges the pinch handle against the flexible elastomer insert when in a first position.

4. The valve of claim 3 wherein the pinch handle is urged against the flexible elastomer insert under the impetus of a coil spring.

5. The valve of claim 3 wherein the pin engagement member is cammed.

6. The valve of claim 3, the pinch member further comprising:
a slot for engaging a pin, the pin extending through to spaced-apart portions of the pin engagement member.

7. The valve of claim 1 wherein the flexible elastomer insert is pliable and silicon-based.

8. The valve of claim 1, wherein the insert handle is engaged with the valve body and extends above the top of the valve body.

9. The valve of claim 1, the pinch member further comprising:
a pinch arm arranged adjacent to the slot.

10. The valve of claim 9 wherein when the pinch arm is in a first position, the fluid flow through the channel is shut off.

11. The valve of claim 9 wherein when the pinch arm is in a second position, the pinch arm retracts and the fluid flows through the channel.

12. A valve for engaging a beverage container, the valve comprising:
a beverage container body having a top container opening;
a valve body with walls defining a channel through the valve body, the walls having a slot between an upper portion and a lower portion of the channel;
an insert handle integrated with a flexible elastomer insert,
wherein the flexible elastomer insert is configured to completely separate from the valve body, and
wherein the flexible elastomer insert is configured to be removed from the top container opening without remaining attached to another component of the valve and one or more ring extensions project outward from outer wall of the flexible elastomer insert to resiliently grip inner walls of the valve body; and
a pinch member engaged with the slot and the flexible elastomer insert so that when the pinch member moves through the slot in an interior of the channel of the valve body, the flexible elastomer insert is pinched to shut off and close any fluid flow through the channel,
wherein when the pinch member moves out of the slot, the fluid flows under the impetus of gravity from the upper portion of the channel to the lower portion of the channel.

13. The valve of claim 12 wherein the flexible elastomer insert is dimensioned to tightly fit against the walls defining the channel, and wherein the flexible elastomer insert has an open top extending beyond a top of the valve body and an open bottom extending beyond a bottom of the valve body.

14. The valve of claim 13 further comprising:
a pin engagement member that urges a pinch handle against the flexible elastomer insert when in a first position.

15. The valve of claim 14 wherein the pinch handle is urged against the flexible elastomer insert under the impetus of a coil spring.

16. The valve of claim 14, the pinch member further comprising:
a slot for engaging a pin, the pin extending through to spaced-apart portions of the pin engagement member.

17. The valve of claim 12, the pinch member comprising:
a pinch arm arranged adjacent to the slot.

18. The valve of claim 17 wherein when the pinch arm is in a first position, the fluid flow through the channel is shut off.

19. The valve of claim 17 wherein when the pinch arm is in a second position, the pinch arm retracts and the fluid flows through the channel.

20. The valve of claim 12 wherein the pinch member is partially enclosed within a lateral member of a downspout assembly, the lateral member extending laterally from the downspout assembly.

* * * * *